(12) United States Patent
Caycedo

(10) Patent No.: US 11,596,816 B2
(45) Date of Patent: *Mar. 7, 2023

(54) RAPIDLY DEPLOYABLE, COUGH AND SNEEZE, AEROSOL CONTAINMENT APPARATUS

(71) Applicant: Claudio H Caycedo, Lubbock, TX (US)

(72) Inventor: Claudio H Caycedo, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,352

(22) Filed: Jun. 7, 2021

(65) Prior Publication Data

US 2021/0402230 A1     Dec. 30, 2021

Related U.S. Application Data

(63) Continuation-in-part of application No. 17/226,068, filed on Apr. 8, 2021.

(Continued)

(51) Int. Cl.
*A62B 23/02* (2006.01)
*A45F 5/02* (2006.01)
(Continued)

(52) U.S. Cl.
CPC .......... *A62B 23/02* (2013.01); *A41D 13/1107* (2013.01); *A45F 5/021* (2013.01);
(Continued)

(58) Field of Classification Search
CPC ..... A62B 18/025; A62B 18/02; A62B 18/084; A62B 18/08; A62B 23/00; A62B 23/02;
(Continued)

(56) References Cited

U.S. PATENT DOCUMENTS 6,338,342 B1   1/2002  Fecteau et al.
8,590,532 B2   11/2013  Forbes et al.
(Continued)

FOREIGN PATENT DOCUMENTS

CN    103446683 B    8/2016
KR    200188195 Y1   7/2000
(Continued)

OTHER PUBLICATIONS

Harry Kim, International Search Report and Written Opinion, dated Jul. 23, 2021, for corresponding PCT application PCT/US2021/026491, ISA/US, Alexandria, VA, pp. 1-9.

(Continued)

*Primary Examiner* — Joseph D. Boecker
*Assistant Examiner* — Brian T Khong
(74) *Attorney, Agent, or Firm* — G. Michael Roebuck; Moster Craft P.C.

(57) ABSTRACT

A rapidly deployable, pressure sealed, cough and sneeze aerosol, containment apparatus and a system to virtually eradicate the cold, the flu, and Covid-19. A face mask having a rigid first section configured to hold a filter and a pliable second section configured to fit on a person's face; a face mask seal formed on an edge of the pliable second section of the face mask; a curved surface on the face mask seal configured to fold inward to form a seal on the person's face when pressed on the person's face.

29 Claims, 17 Drawing Sheets

Related U.S. Application Data

(60) Provisional application No. 63/049,008, filed on Jul. 7, 2020, provisional application No. 63/007,113, filed on Apr. 8, 2020.

(51) Int. Cl.
  *B01D 46/00* (2022.01)
  *B01D 46/10* (2006.01)
  *A41D 13/11* (2006.01)
  *A62B 9/04* (2006.01)
  *A62B 18/02* (2006.01)
  *A62B 18/08* (2006.01)
  *A45F 5/00* (2006.01)

(52) U.S. Cl.
  CPC .............. *A62B 9/04* (2013.01); *A62B 18/025* (2013.01); *A62B 18/08* (2013.01); *B01D 46/0004* (2013.01); *B01D 46/0005* (2013.01); *B01D 46/10* (2013.01); *A45F 2005/006* (2013.01); *A62B 18/084* (2013.01); *B01D 2275/10* (2013.01)

(58) Field of Classification Search
  CPC ........... A62B 23/025; A62B 7/00; A62B 9/04; A62B 25/00; A62B 25/005; A61M 16/06; A61M 16/0605; A61M 16/0611; A61M 16/0616; A61M 16/0622; A61M 16/0683; A61M 16/0688; A41D 13/11; A41D 13/1107; A41D 13/1138; A41D 13/1146; A41D 13/1161; A41D 13/1169; A41D 13/1176; A41D 13/1192
  See application file for complete search history.

(56) References Cited

U.S. PATENT DOCUMENTS

| | | | |
|---|---|---|---|
| 2006/0237013 A1* | 10/2006 | Kwok | A61M 16/0605 128/204.23 |
| 2010/0031962 A1* | 2/2010 | Chiu | A41D 13/1161 128/206.19 |
| 2012/0260920 A1* | 10/2012 | Choi | A62B 18/025 128/206.12 |
| 2013/0000645 A1* | 1/2013 | Schwind | A61M 16/0688 128/206.25 |
| 2015/0336718 A1 | 11/2015 | Dwyer et al. | |
| 2018/0035773 A1* | 2/2018 | Wiegand-Hansen | A45F 5/021 |
| 2018/0353783 A1 | 12/2018 | Dwyer et al. | |
| 2021/0353798 A1* | 11/2021 | Spear | A45F 5/021 |
| 2021/0401157 A1* | 12/2021 | Scalisi | A45C 11/00 |

FOREIGN PATENT DOCUMENTS

| KR | 102030473 B1 | 10/2019 | |
|---|---|---|---|
| WO | WO-2012003565 A1 * | 1/2012 | ......... A41D 13/1138 |
| WO | WO2020/028407 | 2/2020 | |

OTHER PUBLICATIONS

Harry Kim, International Search Report and Written Opinion, Sep. 27, 2021, for corresponding PCT application PCT/US2021/36267, ISA/US, Alexandria, VA, pp. 1-8.

* cited by examiner

RAPIDLY DEPLOYABLE, COUGH AND SNEEZE, AEROSOL CONTAINMENT APPARATUS

CROSS REFERENCE TO RELATED APPLICATIONS

This patent application is based on, and takes priority from, U.S. Provisional Patent Application Ser. No. 63/00,713 filed on Apr. 8, 2020 and entitled "A Rapid Deployable Pressure Relief Biological Hazard Mask" by Caycedo and U.S. Provisional Patent Application Ser. No. 63/049,008 filed on Jul. 7, 2020 and entitled "A Rapid Deployable, Pressure Sealed, Cough Aerosol Containment, COVID-19, Cold, and Flu Eradication Mask" by Caycedo, both of which are incorporated by reference herein in their entirety and takes priority from and is a continuation in part of PCT/US/2021/26391 entitled A RAPIDLY DEPLOYABLE, COUGH AND SNEEZE, AEROSOL CONTAINMENT APPARATUS by Caycedo filed on Apr. 8, 2021 which is hereby incorporated herein by reference.

BACKGROUND OF THE INVENTION

The COVID-19 is devastating the world. Our approach to COVID-19 is the wrong approach for three reasons. One, vaccines have never, and will never, stop a rapidly mutating virus. Second, our approach of quarantines is against the very fiber and nature of our social society and will debilitate our world faster than COVID-19 itself. It is like treating a bee hive or an ant bed for a disease by separating all the bees and ants, effectively killing the bee hive or ant bed faster than the disease itself. Third, our approach of continuous face mask use is based on the wrong assumption that COVID-19 is transmitted by breathing and speech aerosols. COVID-19 is actually only transmitted through cough and sneeze aerosols. If you do not define the problem correctly, you will arrive at the wrong solution.

Because, for all practical purposes, COVID-19 is transmitted only through virus laden droplets and aerosols generated by coughs and sneezes, there is a need for a pressure tight mask specifically and comprehensively designed to capture sufficient droplets and aerosols to virtually eliminate the possibility of transmission, even when indoors and at close range and with low ventilation. Close range is hereby defined as when a healthy individual's face is six inches away from an infected individual, i.e., when they are standing shoulder to shoulder in an elevator, for example. When everyone in a given zone (including visitors) agree to use the Covid Cough Cleanser, all transmission within that zone virtually stops instantly. Therefore, no other COVID-19 measure is needed within that zone, i.e., no vaccines, no breathing masks, no social distancing, no business closures or limitations, and no quarantines. This is great for family reunions, the work place, cruise ships, etc. The zones can be scaled up to include towns, counties, States, Countries, or even the entire World. Universal compliance is easy to achieve because the CCM stays out of the way 99% of the time until it is needed to cover a cough or sneeze. The concept is basically like a highly advanced (space age) version of the handkerchief, when used for source control. This update, to the source control use of the handkerchief, is highly overdue, as evidenced by the problems we have encountered with COVID-19; Had this current invention been in universal use throughout the world prior to COVID-19, the COVID-19 pandemic would not have occurred.

In the history of the world, this is the first mask specifically and comprehensively designed for the protection of others. However, if by chance someone in your zone fails to cough without a CCM, your CCM can be used as an emergency (self-protective) face mask until you are safely clear of the offending cough.

Only 4% of the world has been vaccinated. As the world vaccination rollout increases, the opportunity for breakaway mutations increases proportionally. It is anticipated that by the next COVID-19 season, the world's vaccines will completely fail to work. Worldwide, the CCM will step in where vaccines leave off. The CCM is equally effective against all mutations, variants, and even COVID-23, etc.

FIELD OF THE INVENTION

The present invention is involved with biologically protective devices. This invention belongs to a new class of devices that are specifically designed, built, and mass marketed to protect others, rather than to protect the user of the device. This approach is riskier to the self and relies on trust that others will do the same, but it is the most effective approach, and it is believed it is the only approach that has the capacity to ever win the war against the COVID-19 pandemic. This particular device is part of a system specifically designed to stop the COVID-19 pandemic without the help of any other COVID-19 measure, including but not limited to, vaccines, drugs, social distancing, business closure, and quarantines.

SUMMARY OF THE INVENTION

A rapidly deployable cough and sneeze aerosol containment apparatus with an air tight pressure seal and a high flow rate filter. Included with this device are personal instructions and government rollout instructions, together forming a system to stop the cold, the flu, and Covid-19 without reliance on any other COVID-19 measure It is anticipated that current vaccines will fail to work very soon, and this system will be needed as a backup system.

DETAILED DESCRIPTION OF THE INVENTION

Figure 1:
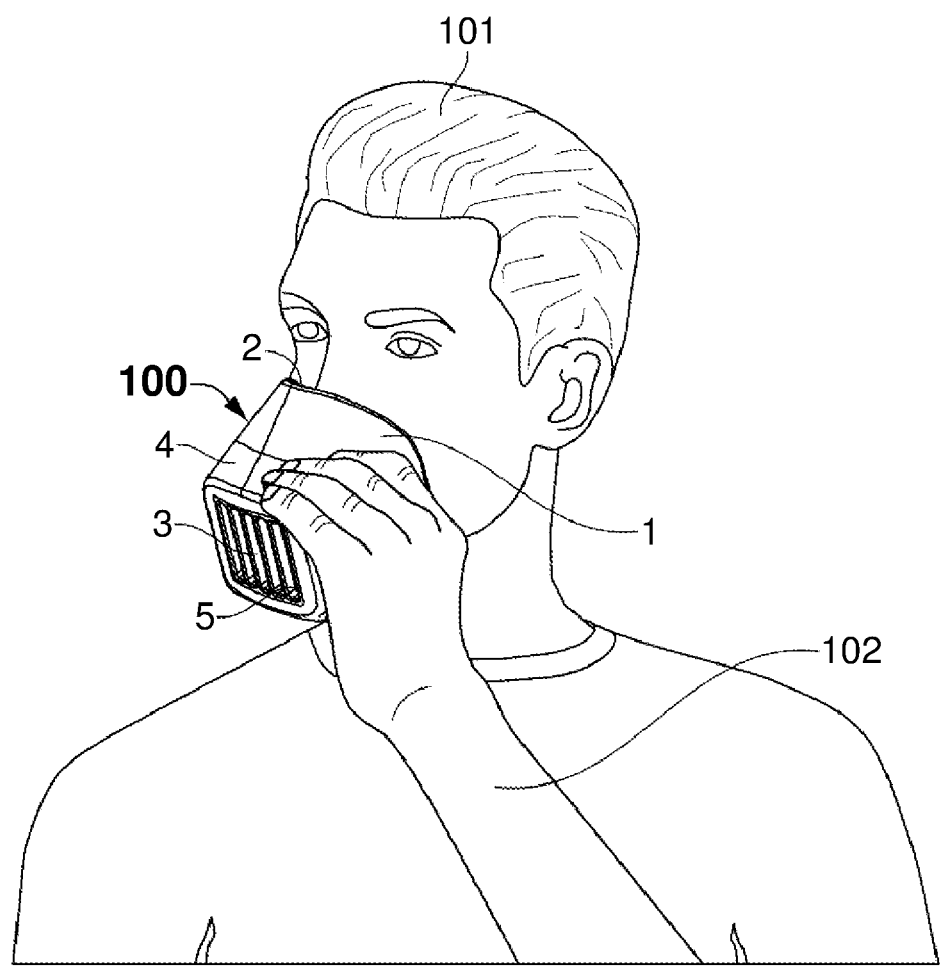
FIG. 1 is a front three quarter perspective view depiction of a device apparatus in a particular illustrative embodiment of the present invention.

It is contemplated that to stop the COVID-19 pandemic, essentially everyone in the world will need to carry, and use as directed, a COVID Cough Mask every day. To keep COVID-19, the cold, and the flu away and to keep future COVID pandemics from forming, everyone in the world needs to continue such use, from here on out. There are a few rudimentary examples of prior art designed for the protection of others through cough and sneeze source control. However, all of these examples fall short in terms of the great efficacy and effectiveness needed to stop COVID-19. In addition, all prior art also falls short in terms of ease of use and total life cycle cost effectiveness.

In particular, most of them are made of disposable materials. This makes them more expensive in the long run, hurts our environment, and requires continuous replacement logistics. For example, U.S. Pat. No. 9,357,805 B2 by Victor S. Wright is a "modified disposable cup." and U.S. Pat. No. 9,723,880B1 by John w Macey, Jr is basically looks and feels like a modified disposable surgical mask. The current invention fills in this void by using materials design to last for years.

In order to stop the COVID-19 pandemic with a cough source control mask, there is a need for a positive pressure seal to be created with as little leakage as possible. Coughs create a positive pressure inside the mask that tends to lift up the edges of the mask and create a potentially deadly leak. Only the CCM adequately addresses this issue by taking multiple steps including, but not limited to, the following measures:

1) The CCM starts with a computer digitized average face geometry and gives the CCM seal a matching geometry to produce a more precise fit. It does not appear that any of the prior art applies this technique.

2) The CCM uses a very low pressure drop filter. This reduces the chance of seal leakage. Through careful analysis and insight, the filter chosen is also able to capture the aerosols that hold the virus. The ability to meet these two opposing design criteria is a marvel in itself. None of the prior art adequately balances these two opposing design criteria.

3) The CCM is the only mask of its type that uses a special seal that is specifically designed to withstand internal positive pressures. The scuba diving mask is specifically designed to withstand positive external pressures by pointing the seal edges outward. The CCM is specifically designed to withstand positive internal pressures by pointing the seal edges inward. None of the prior arts take advantage of this superior internal positive pressure seal design.

4) Similar to a CPR mask, the CCM is designed to be pressed firmly against the face. This firm pressure would not be comfortable for long periods of time, but since a cough only lasts one half second and because the seal is well rounded and of soft rubber, the pressure is in fact comfortable. All prior art is either incapable of supporting such firm pressure levels and as such all have a greater potential for seal leakage and/or is not as comfortable under such necessary pressure.

5) The stiffness of the CCM rubber seal is stiff enough to withstand such pressures but at the same time pliable enough to mold around individual variations of the face. This feature further reduces the change of leakage. All of the prior art examples suffer from an inadequate balance in stiffness and pliability and as such are more prone to leakage.

In the contemplated application of use by essentially everyone in the world from here on out, any small reduction in costs results in a huge cost savings world-wide. Furthermore, in cases of anticipated long term use, total life cycle costs are more important than initial acquisition costs. Thus, even though the initial acquisition cost of the CCM could perhaps be higher, extreme care has been taken to assure life cycle costs as low as possible, including:

1) The CCM uses a low MERV filter that reduces the cost significantly (while still providing exceptional virus capturing ability.)

2) Selecting a low MERV filter further allows the choosing of a washable filter. It is projected that washing the filter allows the filter to last six to twelve months depending on use. This saves money, reduces frequent replacement logistics, helps with material shortage issues, and is good for the environment. It is believed that none of the prior arts use a washable filter.

3) Washable aerosol filters are typically in form factor (non-pleated) which means such filter media is available in large rolls at significant price reductions. Most, if not all, the prior art fail to make use of inexpensive large filter media rolls.

4) Using a filter media allows the CCM to employ a reusable filter holder. Since only the low MERV, washable aerosol filter media is replaced every six to twelve months, filter replacement costs fall to less than one US dollar per year. Most, if not all, the prior art fails to employ reusable filter holders.

It is essential that a device used for Cough Source Control be available, quickly, and easily, when you need it. The cough mask is arguably the best in this regard. The CCM detaches from the belt holder with a single outward tug on the CCM. On replacement, a cover plate on the belt holder assures that infectious material inside the mask is inaccessible.

An illustrative embodiment of a system and method and apparatus for a rapidly deployable cough and sneeze particle containment apparatus (also referred to herein as "Covid Cough Cleanser, CCM or mask") is disclosed herein. In a particular illustrative embodiment of the invention, a face mask and mask holder. The recent COVID-19 pandemic has exacerbated and magnified the need for public protection equipment (PPE) to protect the public from airborne viruses such as SARS-CoV-2. Although the CDC recommends face mask use, mainly for the protection of others, face masks are not specifically designed for that purpose. The paradigm shift here is the current invention is specifically designed, from the ground up, for the protection of others.

In the past, mask usage has been for self-protection, i.e., to keep the individual wearing the mask from being infected by others who spray infected mucous and salivary particles in the air. The new Covid Cough Mask substantially reduces the general release of infectious mucous and salivary particles generated by coughs and sneezes. The new paradigm using the Covid Cough Mask is to protect others and stop the release of infectious mucous particles into the air and therefore more efficiently and effectively reduce the spread of infectious respiratory diseases such as COVID-19, the common cold, and flu.

In the past, with a typical mask, when a person wearing the mask sneezes or coughs, the sudden pressure on the inside of the mask created by the air and mucous particles being expelled by the wearer, lifts the mask off the face at the edges and allows aerosols to escape, and allows infectious mucous particles to spread into the air and cause infections.

Because the CCM has a superior air tight, positive pressure seal, cough and sneeze aerosols substantially take the path of least resistance through the CCM's high flow rate, or low pressure drop, or low flow resistance filter. Once the cough and sneeze aerosols are filtered, the chance of infection is substantially reduced. The Covid Cough Mask is conveniently holstered on a wearer's belt and ready to be deployed at a moment's notice when needed. A wearer removes the CCM from the holster, raises it to their face, and presses the CCM against the face using their hand with sufficient pressure to create a positive pressure seal between the Covid Cough Mask and the wearer's face. In a particular illustrative embodiment, a surgical mask is altered to create the Covid Cough Mask. The filter is held in place inside the mask and air passes from the wearer's mouth or nose and exists the mask through a filtered hole in the Covid Cough Cleanser. The mask hole is large enough to allow the sneezed air to exit the mask rapidly after passing through the filter. In another particular embodiment, a grill is provided to protect the external surface of the filter. The filter reduces the concentration of infectious droplet and aerosol particles (also referred to herein as just "aerosols") that are released into the air by COVID-19 carriers, thus reducing the spread of the SARS-COV-2 virus. Once the basic reproductive number, within an active zone, falls below 1.0 the pandemic in that zone will die off.

In another particular embodiment, the Covid Cough Cleanser is custom fitted to a wearer's face so that less pressure is required to seal the mask to the wearer's face. The size of the exhaust hole (or "hole") in the mask determines the flow rate of the air out of the filter. A larger hole allows the air to escape the mask easier. In another particular embodiment, a CPR mask is altered to create the Covid Cough Cleanser. The custom fitted mask does not use a CPR mask to create the CCM but instead creates the CCM, as molded custom soft rubber or other pliable material custom fitted to a wearer's face.

In a particular illustrative embodiment of the invention, all activities outside of homes in an active region will substantially return to normal when everyone in that region carries and uses a particular illustrative embodiment of the invention, referred to herein as a "Covid Cough Mask". (Herein cough will also imply sneeze.) Those who cannot reliably use the Covid Cough Mask, the very young, very old, very sick, etc., will use the CCM as best as possible but remain quarantined until all residual cases are resolved, and the region is COVID-19 free. At this point they will continue to use the CCM as best as possible and will be released from quarantine.

The Covid Cough Mask is substantially better at catching cough aerosols compared to what is in common use today . . . the tissue, commonly referred to as a KLEENEX™, the inside of the elbow, and a surgical mask. The problem with the tissue, elbow and surgical mask is that particles from a cough or sneezed are allowed to escape due to the rapid pressure increase encountered when a person sneezes or coughs into a tissue, elbow, or surgical mask. A surgical mask lifts off the face during a cough or sneeze allowing particles to escape from the mask along the edge of the mask instead of passing through a filter so that the particles are captured in the filter and do not escape to risk infecting another person. Furthermore, continuous use of face mask is tedious and takes away energy and attention from the real problem: cough and sneeze aerosols.

In a particular illustrative embodiment of the invention the filter for Covid Cough Mask is specifically designed to fully trap virtually all cough aerosols that may contain virus particles. The Covid Cough Cleanser is made of low cost materials similar to a CPR mask but with a high flow rate aerosol filter. As with a CPR mask, firm hand pressure presses the CCM against the face and creates a tight air, positive pressure seal between the mask and the wearer's face and there are no attachment straps on the CCM. In a particular illustrative embodiment, the Covid Cough Cleanser is carried in-hand while squeezing into tight spaces such as the middle seat of an airplane or in a side "holster" attached to a dress belt. Both allow for a "quick draw" mask retrieval to catch any cough aerosols. In a case wherein another is nearby cough is not covered by a CCM, it just turns out the Covid Cough Mask can double as a highly effective emergency personal protective breathing mask to be used until one can safely leave the immediate dangerous area or preferably, go outdoors. It is important to note that such emergency use was not a design criterion, but rather that it just worked out that way, after the design was complete, by sheer coincidence and good fortune. In order to fully optimize efficacy and efficiency, the one and only design criteria of the CCM was to create the most effective and efficient Covid-19 Cough Mask humanly possible given current technology. Also, by sheer coincidence and good fortune, the CCM is effective against other respiratory diseases including, but not limited to, the common cold and flu. Please note that also by coincidence and good fortune, the CCM System is not affected in any way, shape, or form, by mutations or variants of COVID-19. (By contrast, these mutations and variants are the Achilles heel of all COVID-19 vaccines). In fact, also by coincidence and good fortune, the CCM System will be 100% effective against any future coronavirus pandemics that may arise from the region around Wuhan, China starting in 2023.

Universal compliance within a zone is essential. A "zone" is a region where universal use of the CCM is mandatory either by law or by mutual agreement. A zone can be a family reunion, a nursing home, a ship, a military base, a town, a county, a state, a country, or even the entire world. Luckily, Covid Cough Mask compliance comes easy and naturally. Daily wear will be like wearing a clothing accessory . . . that everyone else is also wearing. Actual deployment and use of the Covid Cough Cleanser is typically rare and lasts only seconds! (Anyone repeatedly coughing should be quarantined.) The Covid Cough Mask will be as natural and easy to use as a Handkerchief being used as source control. My father never left his house without a clean handkerchief peeking out of his back pocket. Nowadays, we naturally look for a Kleenex before coughing, but the KLEENEX™ box is rarely nearby. Under current conditions, asking everyone to use a CCM could perhaps be a hard sell, however, when the anticipated total failure of vaccines occur and infections and deaths skyrocket to currently unfathomable levels, and governments apply earths last stand, quarantines, and business closures, then everyone will gladly wear the CCM to immediately stop COVID-19, remove all other COVID-19 measures, and return to pre-COVID-19 normal life.

In a particular illustrative embodiment, substantially everyone in a zone will receive a Covid Cough Mask before distribution moves to next zone in line. Universal compliance is thereby substantially achieved zone by zone (as quickly as masks are manufactured.) Active zones will be "closed" meaning visitors to the zone or travelers "just passing thru" the zone must have a Covid Cough Mask, and demonstrate proper use of it, to enter the region.

With such universal distribution and compliance within a region, the local basic reproductive rate in that region will suddenly drop to nearly zero bringing a quick end to the COVID-19 epidemic in that region. This can be safely, easily, quickly, and inexpensively tested and verified in a small town, a cruise or military ship, a military base, a nursing home, or any other controlled access region. For the re-assurance of everyone, the CCM can first be safely tested as an adjunct to all currently existing COVID-19 protocols such as social distancing, masking, etc. When the reliability of the CCM System to predictably, immediately, and dramatically stop virtually all new infections in any given region is firmly established, the CCM System can then be safely tested without any other COVID-19 protocols in place. Because the effect of the CCM is so dramatic and immediate, it will only take a few weeks or months to prove its efficacy beyond a shadow of a doubt. At this point, there will be an all-out race to deliver the CCM System as quickly as possible throughout the world.

In a particular illustrative embodiment of the invention (also referred to herein as a "Covid Cough Cleanser") a filter holder is removable from the back (or inside) of the mask. This allows cough and sneeze pressures to produce a seating pressure on the filter holder instead of a dislodging pressure as would be the case if the filter holder were removable from the front of the CCM. This will help maintain a tight pressure seal between filter holder and the main body of the CCM.

In a particular illustrative embodiment of the invention a new apparatus for virus capture is disclosed. Masks designed to capture virus sometimes make it a goal to capture the virus directly. In particular, care is taken to ensure the filter used is capable of capturing particles as small as the virus in question. This can sometimes lead to highly restrictive filters that produces a high pressure drop across the filter and that in turn lifts an apparatus off the face promoting leakage and infection; This is particularly inadequate in the application of filtering high velocity coughs and sneezes. In the design of the CCM it is specifically recognized that when we cough or sneeze viruses are not free floating but are generally well adhered to, or trapped inside, cough and sneeze aerosol particles. It is the strategy of the CCM method, instead, to target these larger, heavier, virus "vessels." Catch the aerosol, catch the virus. It is recognized that, especially with hard coughs or sneezes, a few viruses may break free, but not in sufficient quantities to cause infection.

Generally, the filtration mechanics available are gravity sedimentation, inertial impaction, interception, diffusion, and electrostatic attraction. Of these, inertial impaction methods are directly more efficient the heavier the target object is. Furthermore, inertial impaction methods can be more efficient the faster an object moves. What is more, inertial impaction methods are less restrictive, or have a lower pressure drop, than other methods like say the direct interception method; This is particularly important in our goal of filtering high velocity coughs and sneezes. In summary, inertial impaction methods are effective at capturing heavier and faster moving particles while maintaining a lower pressure drop across the filter and therefore are particularly well suited for the CCM.

In a particular illustrative embodiment of the invention, a high flow rate filter is provided from Zoro manufacturing at https://zoro.com with the following product number and specifications.

Filter example. Air Handler #2GJH2 Specifications
Zoro #: G7514981 Mfr #: 2GJH2 available from Zoro at https://zoro.com
Specifications: finer Air Filter Roll, Style—Air Fibers Nominal Filter Size 8 in×90 ft×1 in, Performance Rating MERV 8, Filter Efficiency—Air Filters 60 Percent, Common Applications General Use, Media Material Polyester, Surface Tackifier Yes, Media Color Orange/White, Filters Out Cat & Dog Dander, Cement Dust, Dust Mites, Dusting Aids, Fabric Protector, Hair Spray, MERV 5-8 Mold, Pudding Mix, Spores, Removes Particles Down To 3.0 to 10.0 microns, Initial Resistance @ 300 fpm 0.19 in wc.

Other similar filters can be used in another particular illustrative embodiment of the invention.

In a particular illustrative embodiment of the invention, a Longer Filter replacement cycle is a goal of, and is achieved by, the CCM. In this regard, it is noted that:

a) Typical fine, virus filters have a problem with clogging. Fine filters tend to get clogged quicker and need to be replaced more frequently. This is especially true when larger sputum particles could be in the mix, as is sometimes observed in cough or sneeze applications. Courser aerosol filters are more porous and therefore last longer, particularly so in this application.

b) Humidity. Some prior face masks and other filters tend to degrade with the moisture in our breath. This is especially important with coughs and sneezes that can be quite moist at times. Nonabsorbent, fibrous fiber, aerosol filters degrade less with moisture and therefore last longer.

c) Rinsible under tap water. Fine filters designed to catch viruses tend to be non-washable. CCM aerosol filters are rinsible under ordinary tap water.

d) Re-usable. Virus capturing filters tend to be disposable and therefore tend to have high, long-term, operating expenses. CCM aerosol filters are re-usable and will last six to twelve months, depending on use.

The CCM is designed to be used, from here on out, by everyone on earth; therefore, total life-cycle costs are a high design consideration. In a particular illustrative embodiment of the invention a Re-useable Filter Holder is provided. Only the raw, cut filter stock is replaceable, thereby lowering total life cycle costs.

In a particular illustrative embodiment of the invention, inexpensive, yet long-term durable materials are chosen. Aside from the filter, all other CCM materials are durable long-term and should last for years. This will further reduce total life-cycle costs and increase convenience.

The world is currently facing a protective gear material shortage. The CCM addresses this issue by choosing durable materials and reusable filters. Also, aerosol filters are currently in abundant supply. Furthermore, by definitively stopping the COVID-19 pandemic, material shortages should improve.

In a particular illustrative embodiment of the invention a filter holder is accessed from the back of the apparatus instead of from the front of the apparatus. This design feature ensures that hard sneezes do not tend to separate the filter holder from the apparatus but instead bring them together tighter.

In a particular illustrative embodiment of the invention Filter Holder Fasteners are provided. The filter holder fasteners hold the filter holder firmly against the body of the CCM. This helps create a good pressure seal between the filter holder and the CCM body.

In a particular illustrative embodiment of the invention a Filter Holder Screen is provided. The filter holder access panel doubles as a filter screen. This screen helps hold the filter in place, protects the filter from physical damage, and screens out larger sputum particles that may be expelled during a cough or sneeze, thereby helping to keep the filter clean.

In a particular illustrative embodiment of the invention, wide grill spacing is provided. The wide grill space allows high velocity air flows generated by coughs and sneezes to flow freely, with less aerodynamic friction; The grill also holds the filter in place and protects it from external physical damage.

In a particular illustrative embodiment of the invention a large filter cross-sectional area is provided. The cross-sectional area of the filter is intentionally made larger to accommodate cough and sneeze high flow rates with less aerodynamic drag and thereby lower the pressure drop across the filter.

In a particular illustrative embodiment of the invention a thick filter is provided. The filter is intentionally made thicker as a redundant safety feature. In a particular illustrative embodiment of the invention a one-inch-thick filter is provided instead of a half-inch-thick filter. Other filter thicknesses could be used including, but not limited to, 2 inches.

In a particular illustrative embodiment of the invention, a folded back rubber seal is provided. It is specifically recognized that this is the reverse, or an inversion of, a scuba diving mask seal design. In a scuba mask the seal edges point outward, and the positive pressure is outside the mask. In the CCM design the seal edges point inward and the positive pressures generated are inside the apparatus. This makes for a tight, internal positive pressure, seal design, which makes it a perfect seal design for this application of covering coughs and sneezes.

In a particular illustrative embodiment of the invention a Rubber Seal is provided. The Rubber Seal is contoured to exactly match generic, or averaged, face contours of different sizes and shapes.

In a particular illustrative embodiment of the invention the Rubber Seal provides softness and is pliable enough to conform to individual differences in facial anatomy to help maintain a positive pressure seal.

In a particular illustrative embodiment of the invention, an Inexpensive injection molded plastic design is provided. The Body of the CCM and the filter holder are made of inexpensive injection molded plastic.

In a particular illustrative embodiment of the invention, the CCM is designed to be more usable with eyeglasses. The CCM does not extend into areas near, or around, the bridge of the nose. This feature makes the CCM more easily used by people who wear vision corrective glasses or sunglasses.

In a particular illustrative embodiment of the invention, no permanent straps are provided nor needed nor desired. This design feature recognizes that when quickly deploying the CCM, straps could swing in-between the face and seal, causing a potential compromise of the pressure seal. Therefore, no permanent straps are present. The CCM is held in hand and firm hand pressure pushes the CCM against the face and creates a positive pressure seal between the mask and the face. (A positive pressure across the seal is hereby defined as air pressure inside the apparatus being higher than the external, ambient air pressure.) In a particular illustrative embodiment of the invention, a CCM Belt Holder is provided. At the heart of the Covid Cough Cleanser is a continuously convenient, quickly accessible, CCM Belt Holder. This is an essential part of the plan of having the CCM with you at all times while in public places and out of the way of everyday activities, yet very convenient to access at a moment's notice. In certain crowded situations, such as while seating in the middle seat of an airplane, the CCM may be held in hand or on one's lap. Care must be taken, if the CCM is carried on a lanyard, to prevent the lanyard from being accidentally placed between the face and CCM during quick deployments and thereby potentially compromising the pressure seal. A lanyard that is easily detachable by a quick yank on the CCM is specifically envisioned.

In a particular illustrative embodiment of the invention, a CCM hygienic cover is provided. Integral to the belt holder design is a cover that prevents access to potentially contaminated surfaces inside the CCM. This design feature helps to prevent indirect, or fomite, infections.

In a particular illustrative embodiment of the invention, mask holder arms are provided. The belt holder has two arms that hold the CCM in place when the CCM is docked with the belt holder.

In a particular illustrative embodiment of the invention, a toggle mechanism for the mask holder arms is provided. Upon docking the CCM into the belt holder, firmly pressing the CCM against the Belt Holder activates an integrally designed Toggle Switch that triggers the mask holder arms to clamp shut around the CCM and thereby maintain the CCM docked with the Belt Holder.

In a particular illustrative embodiment of the invention, a quick release design feature is provided. The CCM Holder Arms have CCM Holding Pads (or hands) with a ramp feature. As the CCM is pulled directly away from the Belt Holder, the ramp separates the CCM Holder Arms further apart and thereby triggers the arm toggle mechanism to fully snap open the mask holder arms and thereby quickly releasing the CCM. The arms are held in this open position until the CCM docked again.

In a particular illustrative embodiment of the invention, a toggle mechanism is specifically designed to open and close both arms, simultaneously. This feature helps keep the CCM centered on the mask holder. In another particular illustrative embodiment of the invention, independent toggle switches, placed laterally to the docked CCM, are used to keep the CCM closer to the body and out of the way.

In a particular illustrative embodiment of the invention, left and right-hand use is facilitated. Aligning the CCM upright on the belt holder allows for left/right symmetry so that the CCM belt holder can be donned on the left-hand side by left handers or on the right-hand side by right handers; It also allows the shape of the back of the mask to match the arched shape of the hip more closely and therefore, allow the docked CCM to be closer to the body and more out of the way.

In a particular illustrative embodiment of the invention, the size of the CCM is a carefully chosen compromise between large enough to easily cough and sneeze into and to accommodate a large filter, and yet small enough for ease of handling and portability.

The Covid Cough Cleanser, the face, and the hands should be wiped down after each deployment and use. Therefore, part of the contemplated system is to also carry a small package of disinfectant wipes on a belt holder. This will allow the CCM to be held in one hand while a disinfectant wipe is conveniently accessed with the other hand . . . as opposed to rummaging thru a purse or a pocket for a wipe dispenser and then pulling a wipe with one hand while securing the wipe dispenser with the other hand.

In a particular illustrative embodiment of the invention, a Belt Holder Funnel is provided. A spreading angle on a CCM Hygienic Cover "Extension" provides funneling or guidance to docking the CCM with the Belt Holder. This makes it easier to align the CCM with the belt holder with less visual assistance. This design feature is especially helpful to younger children and the elderly.

In another particular illustrative embodiment of the invention, a Grip feature is provided. This design feature will allow easier grip of the CCM during deployment and docking.

In another particular illustrative embodiment of the invention, Temporary Straps are provided. To be used for convenience when the CCM is to be used as a self-protective face mask for an extended period of time. (Useful mainly, but not limited to, prior to the CCM going into universal use.)

System of Implementation to Immediately and Dramatically Stop COVID-19. It is specifically recognized that virtually all direct and indirect Covid-19 infections are caused by droplets and aerosols generated by coughs and sneezes. It is further specifically recognized that although infected particles can be expelled during normal speech and normal breathing, these activities cause virtually zero infections; It is further recognized that any assumption to the contrary is an extremely deadly assumption because it deviates the world from the correct approach to eradicating COVID-19. In general, if we assess a problem incorrectly, we have already lost the battle; Regardless of how hard, carefully, or long we work through the problem, we will arrive at the incorrect solution. Specifically, the correct approach to eradicating COVID-19 is by using the CCM to cover all coughs and sneezes.

The preferred mask filter media is encased in the filter holder. This allows the inside of the mask to be wiped down with a disinfectant wipe after each use without wetting or chemically affecting the filter media itself. The filter holder will feature a widely spaced grill on the outside of the mask. This allows for physical protection of the filter, ease of airflow, and low cost. The filter holder will feature a plastic mess, on the inside of the mask, that will help catch larger mucous particles. (These are to be wiped off afterwards.) Mask filter holder should be removable from the back, or inside, of the mask. This allows cough and sneeze pressures to generate a seating pressure on the filter holder instead of a dislodging pressure. This will help to keep a tight seal between the filter holder and the main body of the mask. The filter media has only one layer. However, alternate configurations could include several layers such that upstream layers could be more course and downstream layers could be finer. In particular, a downstream HEPA filter could be use, but it is not required.

The Mask should normally not have straps that might inadvertently get in-between the face and the mask and weaken the face/mask seal. The mask is normally held only by firm hand force against the face and only during a sneeze or a cough. The Mask may have (removable) straps for temporary use without hand pressure. However, long term light strap pressure may not provide as tight a seal as short term firm hand pressure. (Long term firm strap pressure may not be tolerable.) Thus strap use may be ok for use as breathing mask but may not be as effective as a sneeze catcher. Therefore, if one has to cough while using the CCM as a breathing mask, firm hand pressure is still required during the cough. Furthermore, prolonged continuous use of mask may moisten the filters due to expiration humidity and reduce effectiveness. Mask should be light weight for ease of toting and deployment. The CCM can be used as breathing mask for short periods of time . . . as when someone next to you does not deploy their CCM correctly or in time. The CCM should be constructed in enough sizes and shapes to fit and seal properly on most everyone. The mask should be distributed by folks trained to help choose the right fit. In special circumstances, a custom mask or a custom adapter could be made by taking a digital scan of a face (at a higher cost.)

In another particular illustrative embodiment of the invention, those with eyeglasses are provided with a version of the CCM where the nose bridge sits lower. The CCM mask should be made of material strong enough to withstand firm hand force pressing the mask against the face (as done so in normal use.) The end edges or borders of the mask touching the face should be folded inward. However alternate seal designs are envisioned including, but not limited to, a balloon border, a single ridge, multiples ridges, or a combination thereof. The seal material should be made of soft silicon rubber, although other materials are envisioned including but not limited to latex rubber and butyl rubber, other synthetic rubbers, and natural rubber.

Air flow resistance thru the aerosol filter should be low enough so as to not cause pressure build-up inside the mask high enough to cause leakage of unfiltered air around the edges of the mask during normal use. The air flow resistance can be controlled thru material choice, density, thickness, number of filter layers, filter size (the larger the filter the lower the resistance,) and location (directly in front of mouth/nose would be best.)

In another particular illustrative embodiment of the invention the CCM is carried in such a way so as to make for a quick deployment, such as but not limited to, a mask holder attached to the hip, a lanyard, a holder attached to the chest, a holder attached to a leg or ankle (to be used while seating for example), and a holder attached to the forearm or wrist that places the mask near the hand.

In another particular illustrative embodiment of the invention, Design and Manufacture of production model should be optimized for quick production and low costs, so as to optimize for quick distribution to every human in America and possibly the world. The idea is to optimize the saving of lives everywhere.

According to the Centers for Disease Control (CDC) and the World Health Organization (WHO) (as of Mar. 31, 2020), COVID-19 is transmitted by respiratory droplets and aerosols (hereinafter aerosols) expelled when an infected person coughs or sneezes (hereinafter coughs). The virus is not free-floating but embedded in these respiratory aerosols. Therefore, if we completely contain these aerosols as they are exiting the mouth and nose, we will completely stop SARS-CoV-2 transmission. When everyone does this, the basic reproductive rate (R-0) will immediately plummet close to zero and new cases will practically cease to exist. Within months, life will essentially return back to normal: We will once again see full commercial flights, sold out concerts, and packed sporting events. Inadvertently, the flu and the common cold will also be stopped. What is more, we will have a completely effective shield in place against new coronavirus pandemics epidemiologists suggest will arrive soon.

Many believe stopping COVID-19 or the flu in this fashion is impossible, but in reality, we have never truly attempted it. As with any new mission, the first step is to design and build a new tool specifically to accomplish that task. It is believed that no one has ever designed, mass produced, and marketed a mask specifically for containing infectious cough aerosols.

Let us let this new tool be called the Covid Cough Mask (CCM). To ensure its success, the CCM should be developed by a team of fluid dynamicists, aerodynamicists, mask engineers, filter scientists, microbiologists, and infectious disease specialists. This would be best accomplished by a joint effort between NASA and the CDC. To optimize effectiveness, the CCM will have only one design objective: to capture sufficient cough aerosols to eradicate any possibility of infection. The borders of the CCM will be made of soft rubber like that of a respirator mask, and when the CCM is firmly pressed against the face, an excellent positive pressure seal will be created. The bulk of the mask will be made of inexpensive hard plastic. The upper border will be sufficiently below the nose bridge to permit use with eyeglasses, and a removable filter holder will be located directly in front of the mouth and nose. Its fibrous aerosol filter will be washable, replaceable every six to twelve months of high efficiency in capturing virus laden aerosols and will have a pressure drop well below the CCM's sealing capacity. An optional washable HEPA filter may be added downstream of the aerosol filter. The filter size will be approximately 2"×3"×1 or 2". Because the CCM is sealed with hand pressure and is only used for brief periods, no support straps are needed, nor are they desired, for they could accidently swing between the CCM and face, thereby potentially breaking a good pressure seal. The CCM may be conveniently toted in a carrier suspended by a dress belt; after clicking the CCM into the carrier, the inside of the CCM will become sealed. We do not need to develop any new science or technology; everything we need to design the CCM already exists. To avoid interruptions in production and distribution, the CCMs will be manufactured in domestic plants from domestic materials. It is envisioned that 3M will be involved. The CCMs will be delivered door to door by a fleet of vans, and to ensure good CCM fit, trained delivery personnel will choose the right size and shape for each recipient. Recipients will briefly step outside their homes for this fitting. The complete cost of development, manufacture, custom fit, delivery to all US inhabitants, and project management will be about $5 billion: much less than the trillions of dollars the federal government has ineffectively spent on COVID-19. The slight inconvenience of carrying CCMs is not much different than that of carrying old-fashioned handkerchiefs.

This aerosol containment approach requires universal participation for effectiveness. Once CCMs begin rolling out of factories, it will take another year or so for the entire U.S. to be supplied. In the meantime, 100% participation may be achieved in smaller geographical zones—a county, city, or town, for example. All U.S. CCMs produced should be shipped to the hardest hit zone first, and when that zone is 100% supplied, all deliveries would proceed to the next hardest hit zone, and so on. Once a zone is 100% supplied a start date would be designated for that zone. On this date, everyone in all public places would be required to properly carry and use the CCM, and check points would assure that no one entered the city without a CCM. Those who could not follow city code, like small children, the very old, and very sick, would remain quarantined, but would be asked to use the CCM as best as possible, nonetheless. The number of new cases would dramatically drop to near zero immediately. A few new cases may arise in homes, hospitals, and by those still in quarantine, etc., but within a few months there will be no additional cases and all pre-existing cases will resolve shortly thereafter. At this point the zone will be declared COVID-19 free and all quarantines will be lifted. This process will be repeated until the entire nation is declared COVID-19 free. At this point all future masks produced will be donated to countries in need. A similar process will simultaneously take place in all countries until the world is declared COVID-19 free. Afterward, use of CCMs will continue indefinitely, worldwide to keep COVID-19, the cold, and flu at bay and to prevent any new COVID pandemics.

This CCM aerosol containment approach miraculously solves many issues simultaneously: On day one of implementation, businesses may immediately and fully and reopen without social distancing, saving the U.S. economy trillions of dollars. On day one of implementation, the number of new cases in public areas of a zone will immediately plummet to near zero and within a few months, that zone will become COVID-19 free. The cold and flu will be finally eradicated. No other approach can return life to normal. Quarantining the virus in a CCM is more effective and efficient than quarantining humans. We can avoid rushing vaccines without adequate trials. Similarly, we can avoid approving ineffective drugs without proper testing. Briefly covering coughs with a CCM is much more efficient and effective than continuously wearing a face mask. Because CCMs are easier to use, compliance will be vastly greater than observed with face masks. In the rare event of an unprotected cough, the CCM will double as an effective protective breathing mask, making the CCM aerosol containment approach fail-safe. Because CCMs capture contaminated aerosols before they land on surfaces, there will be no shortage of disinfectants and sanitizers. CCMs keep hands cleaner while covering coughs. By avoiding COVID-19 altogether, the aerosol containment approach will save the world from unprecedented levels of pain, suffering, and death. Furthermore, hospitals will once again be dedicated to other serious diseases. Perhaps most importantly, saving each other's lives with a CCM and placing our lives in each other's hands will inadvertently transform our world into a truly loving, and trusting, brotherhood of man.

Typically in the past, mask have been used to capture small particles like viruses with small pore filters. However, when we cough, or sneeze viruses are not generally free floating but are trapped inside aerosol particles. So, if we catch the aerosol, we indirectly catch the virus. Therefore, our approach is to catch cough and sneeze viruses with aerosol filters. (With an especially hard cough or sneeze some virus may break loose from that aerosol, but not enough to cause infection.) A problem we encounter when we capture small particles like viruses with small pore filters is a high pressure drop. This problem is made even worse when we filter high flow rates like those in coughs and sneezes because the pressure drop increases with air speed. High pressure drops are a problem because they tend to lift a mask off the face and cause leakage. A preferred filter is disclosed herein that is very porous and therefore has a very low pressure drop addressing the problem described.

A preferred filter disclosed herein provides a longer filter replacement cycle.

a) Clogged pores are a problem in prior masks. Small pore filters tend to get clogged quicker and need to be replaced more frequently. This is especially important with coughs and sneezes as larger sputum particles could be in the mix. A preferred filter is more porous and therefore solves this problem. Humidity is another problem with prior mask that is solved by a particular illustrative embodiment of the invention. Face masks and other filters tend to degrade with the moisture in our breath. This is especially important with coughs and sneezes as they can be quite moist at times. Aerosol filters degrade less with moisture and therefore improve the situation.

A preferred filter is rinsible under tap water. Face masks and other filters designed to catch viruses tend to be non-washable. Some aerosol filters are rinsible under tap water.

A preferred filter is reusable. Most virus capturing filters are disposable which make them expensive to use. CCM filters are re-usable and, depending on use, will last six to twelve months when used as directed.

The preferred filters disclosed herein are less expensive than other fine pore virus capturing filters. The preferred filter holder disclosed herein is a reusable filter holder. Only the filter is replaced. The raw, cut filter stock is replaceable in 6 to 12 months depending on use. To save maintenance costs, the filter holder is re-usable. In a particular illustrative embodiment of the invention the apparats is made of Long-term durable materials. Aside from the filter, all other CCM materials are durable long-term and should last for years. This will further reduce costs and convenience. This is an important design feature given that once CCM use becomes universal, it is expected CCM use will remain forever.

Material Shortages. A common problem the world is facing is protective gear material shortages. The CCM will reduce the need for such short supply materials and aerosol filters are currently in abundant supply.

The filter holder is accessed from the back of the mask. This feature ensures that hard sneezes do not tend to separate the filter holder from the mask but instead bring them together tighter. Filter holder fasteners hold the filter holder firmly against the body of the CCM. This helps create a good pressure seal between the filter holder and the CCM body. A filter holder access panel doubles as a filter screen. This screen helps hold the filter in place, protects the filter from physical damage, and screens out sputum that may occasionally be expelled in a cough or sneeze, thereby helping to keep the filter clean. In a particular illustrative embodiment of the invention, a Wide open grill space is provided that allows high-rate air flows generated by cough and sneezes to flow freely, with less aerodynamic friction; The grill also holds the filter in place and protects it from physical damage. In particular illustrative embodiment, a filter opens up in two equal halves to make the filter media easier to grab and remove from the filter holder. In a particular illustrative embodiment of the invention, a large filter cross-sectional area is provided. The cross-sectional area of the filter is intentionally made large to accommodate cough/sneeze high flow rates with reduced resistance/pressure drops. In a particular illustrative embodiment of the invention, the thickness of the filter is intentionally made thicker than necessary as an extra layer of redundant safety.

In a particular illustrative embodiment of the invention, a folded back rubber seal is provided. This is basically the reverse of a scuba diving mask design. In a scuba mask the seal edges point outward, and the positive pressure is outside the mask. In this design the seal edges point inward, and the positive pressures are inside the mask. This makes for a durable, (internal) positive pressure seal . . . perfect for covering coughs and sneezes.

In a particular illustrative embodiment of the invention, a pliable section of the mask is contoured to exactly match generic face contours of different sizes and shapes. In a particular illustrative embodiment of the invention, the pliable section of the mask is purposefully made of soft flexible material and extended to make the seal pliable enough to conform to individual facial contours and still provide a positive pressure seal. In a particular illustrative embodiment of the invention, a rigid section of the mask the filter holder are made of an inexpensive injection molded plastic.

In a particular illustrative embodiment of the invention, the mask is usable with eyeglasses. The CCM does not extend into areas near the bridge of the nose. This feature makes the CCM more easily used by people who wear vision corrective glasses or sunglasses. In a particular illustrative embodiment of the invention, there are no permanent straps. This method recognizes that when quickly deploying the CCM, straps could swing between the face and seal, causing a potential compromise of the pressure seal. Therefore, no permanent straps are present. The CCM is held in place with a hand and hand pressure seals the CCM against the face.

In a particular illustrative embodiment of the invention, a CCM mask Holder and belt clip are provided. At the heart of the Covid Cough Cleanser is a convenient mask holder and mask holder belt clip are provided. This is an essential part of the plan of having the CCM with you at all times while in public places, while being convenient to access. At certain crowded situations, such as while seating in the middle isle of an airplane, the CCM may be held in hand. Care must be taken, if the CCM, is carried on a lanyard to prevent the lanyard from being accidentally placed between the face and CCM.

In a particular illustrative embodiment of the invention, a CCM hygienic cover face mask receptacle are provided. Integral to the belt holder is a cover that effectively seals access to the potentially contaminated inside surfaces of the CCM. This feature helps to prevent (rare) fomite infections. In a particular illustrative embodiment of the invention, mask holder arms are provided. The belt holder has two arms that hold the CCM in place when not in use. In another particular illustrative embodiment of the invention, a toggle mechanism is provided. The toggle mechanism includes but is not limited to an arm toggle switch closing switch, arm toggle switch opening ramp that provide for simultaneous arm activation. Upon CCM replacement into the Belt Holder, natural seating pressure activates a Toggle Switch that triggers the Mask holder arms to clamp shut, thereby holding the CCM in place. The arm toggle switch opening ramp has arm holding pads. The arm holding pads have a ramp feature. As the CCM is deployed, the ramp gradually separates the arms apart and thereby triggers the Arm Toggle Switch to open the arms fully and hold them there . . . ready to freely allow the CCM to dock back into the Belt Holder upon return. The toggle mechanism provides for simultaneous arm activation. The toggle mechanism is designed to simultaneously open and simultaneously close both mask holder arms. This feature helps keep the CCM centered in place. The CCM provides for left and right-hand use. Aligning the CCM upright on the belt holder allows for left/right symmetry so that the CCM belt holder can be used on the left-hand side by left handers and right-hand side by right handers. The size of the CCM is a carefully chosen compromise between large enough to easily cough and sneeze into, large enough to accommodate the large filter, and yet small enough for ease of handling and portability.

In a particular illustrative embodiment of the invention, a disinfectant wipe dispenser belt holder is provided. Part of the contemplated system is to also carry a small package of disinfectant wipes on a belt holder. This will allow the CCM to be held in one hand while the disinfectant wipe is conveniently accessed with the other hand . . . without having to rummage thru purses or pockets. The disinfectant wipes are used to clean potential contaminants from inside of the CCM. In a particular illustrative embodiment of the invention, the mask receptacle on the mask holder is funnel shaped so that the funnel shape guides the CCM into mating arrangement with the belt holder. In a particular illustrative embodiment of the invention, a grip is provided that allows easier grip of the CCM during deployment and docking. In a particular illustrative embodiment of the invention, Temporary Straps are provided which are available to be used for convenience when the CCM is to be used as a self-protective face mask for an extended period of time. (Mainly useful prior to the CCM going into mandatory universal use.)

Turning now to FIG. 1, in particular illustrative embodiment of the invention 100 a face mask is provided having a pliable second section 1, a face mask seal 2 formed along an edge of the pliable second section, the face mask seal having an inward curved surface, and a rigid first section 4. The pliable second section of the mask and the rigid first section of the face mask are joined together as they are molded together to form a superstructure of the face mask. A filter holder receptacle opening 8 (shown in FIG. 16) is formed as an opening in the rigid front section of the mask. A filter holder 31 front section 5 slides into the filter holder mask receptacle forming an airtight seal between the filter holder mask receptacle opening 8 and the rigid first section 4 of the face mask 100. A plurality of filter air exit ports 3 formed in the filter holder front section allow air to escape from inside the mask after passing through an aerosol filter installed inside of the filter holder. The mask is configured to be held by a person's hand and arm 102, and placed over the person's face 101, and then firmly placed against the face with hand pressure to form a substantially airtight seal between the face mask seal and the persons face.

Figure 3:
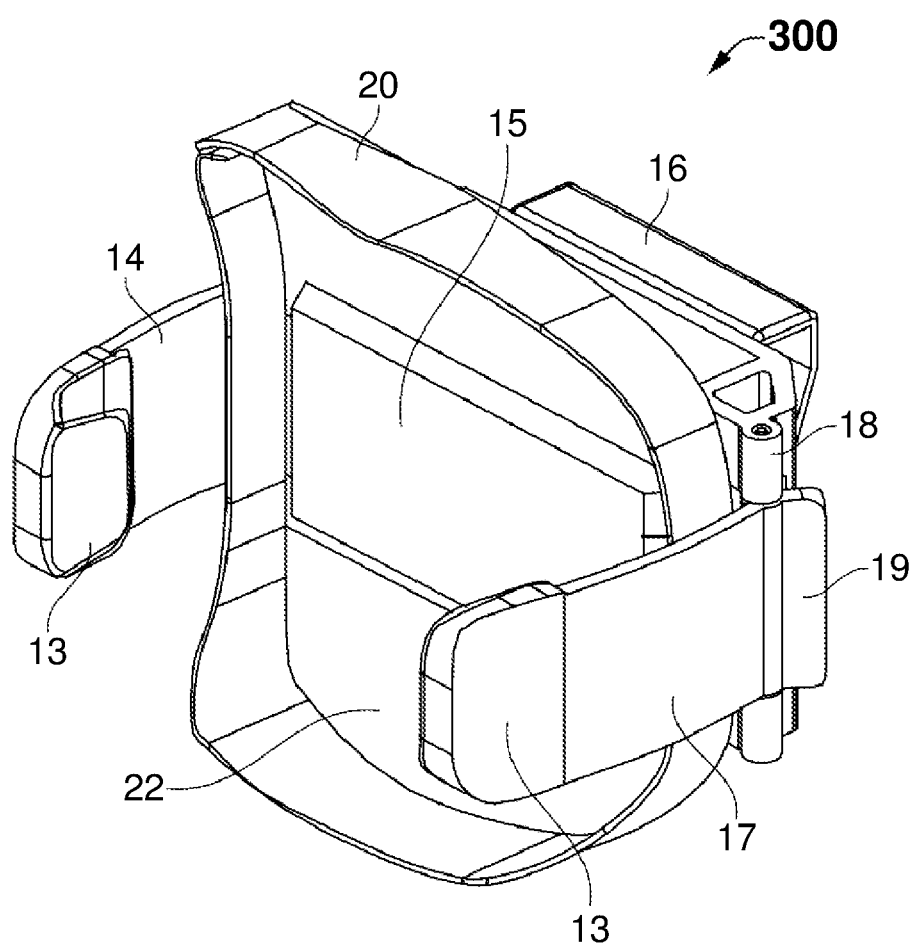
FIG. 3 is a front three quarter view depiction of a mask holder in a particular illustrative embodiment of the present invention.

A face mask holder arm ramp 6 and a face mask holder arm ramp toggle surface 7 are formed in the sides of the rigid first section of the face mask configured to engage and mate with a pair left and right mask holder arm ramp pads 13 that are on the ends of the mask holder arms extending from a mask holder 300 shown in FIG. 3. As the face mask 100 is removed from the face mask holder 300, the angled toggle surfaces 25 on the left and right mask holder arm ramp pads 13, slide along the face mask holder arm ramp toggle surfaces 7, and therefore the first and second face mask holder arms 14 and 17 partially swing open, which in turn triggers a toggle mechanism spring 33 that is buckled aft, to instead buckle forward, which in turn force the first and second face mask holder arms to snap into a fully open position. The face mask holder arm ramp forms an indention 12 in the interior of the face mask. The face mask holder receptacle sides 20 and face mask holder top 22 are attached to the toggle mechanism housing 32 by attachment member 21.

Figure 2:
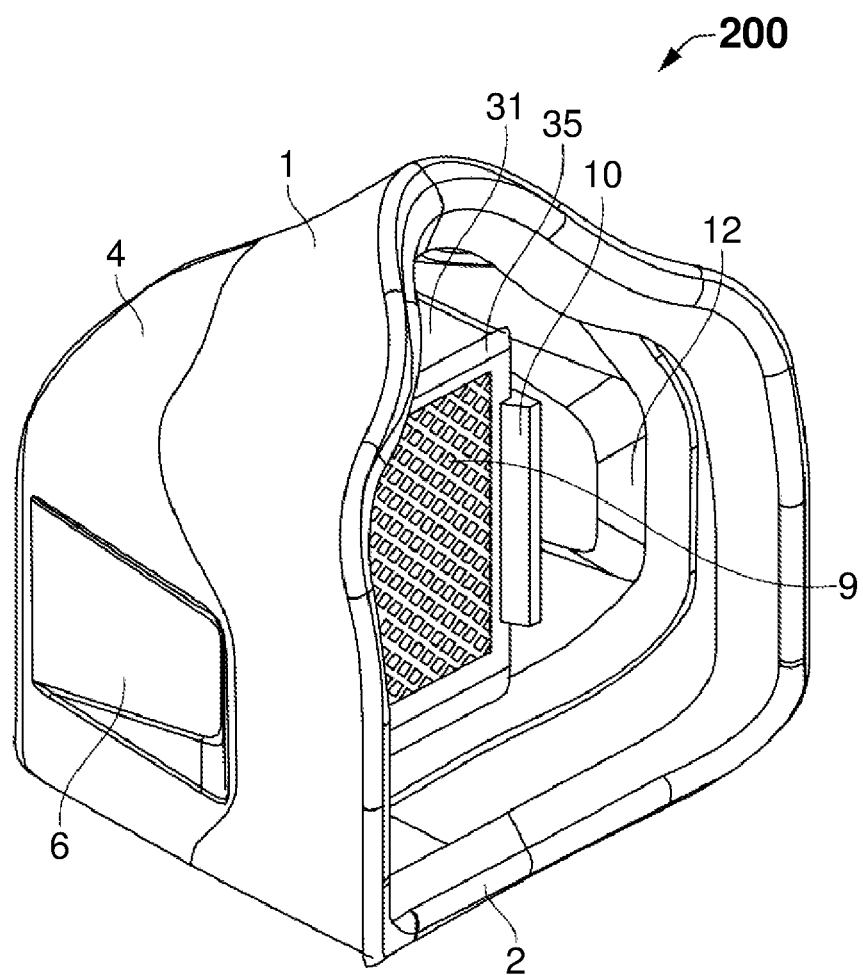
FIG. 2 is a rear three quarter perspective view depiction of a mask in a particular illustrative embodiment of the present invention.

Turning now to FIG. 2, as shown in FIG. 2 as a rear side view 200 of a particular illustrative embodiment of the invention, a filter holder air intake screen 9 with a plurality of porous openings for air flow into a filter holder. The intake grill also blocks larger mucous particles from entering the filter. The open space is 50% of the surface area of the grill in a particular illustrative embodiment of the invention. The filter holder clips into a filter holder clamp 10 to secure the filter holder into rigid first section 4. A rectangular indention 15 formed by the mask holder arm ramp protrudes inwardly into the inside of the mask.

Figure 4:
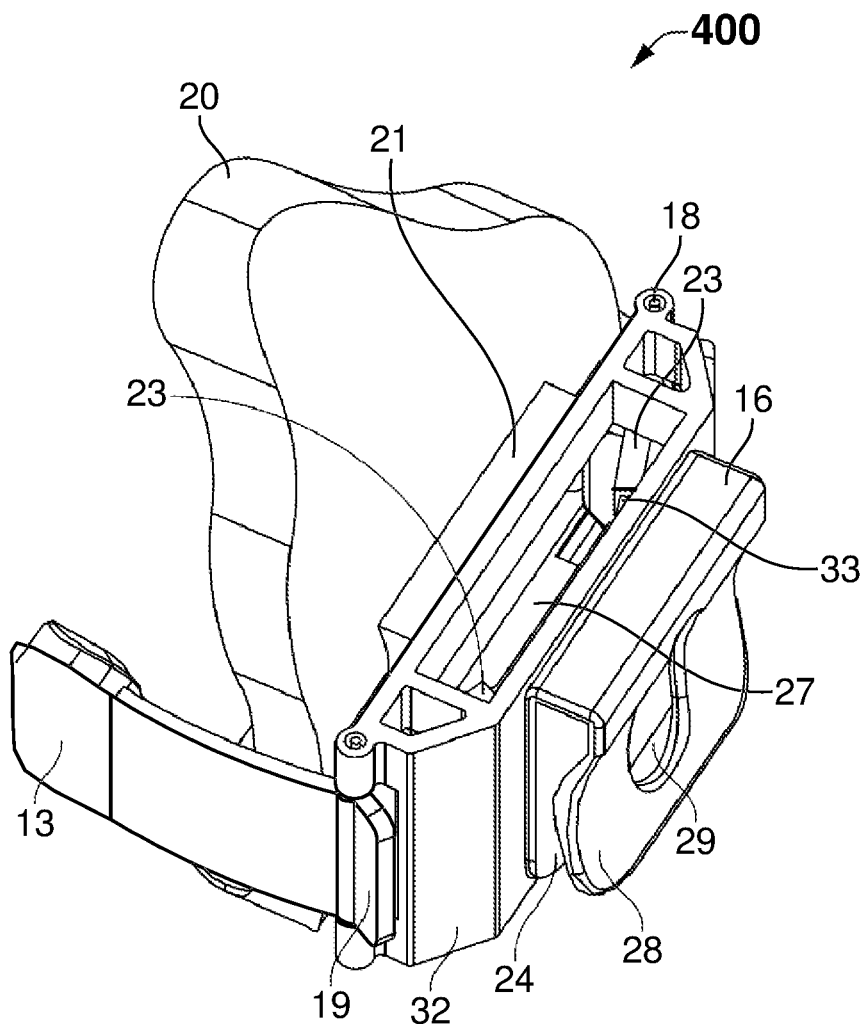
FIG. 4 is a rear three quarter view depiction of a mask holder in a particular illustrative embodiment of the present invention.
Figure 13A:
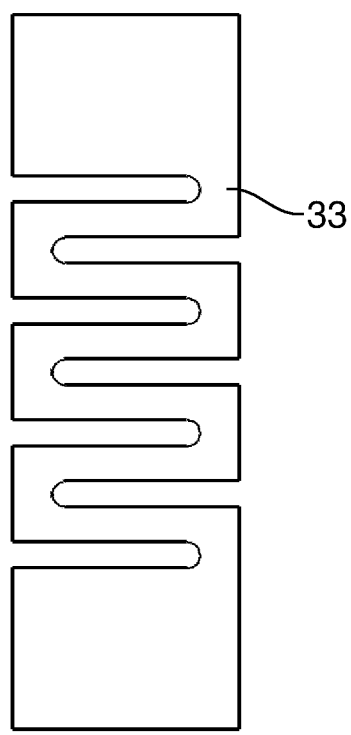
FIG. 13A is a rotated front view depiction of a spring in a particular illustrative embodiment of the present invention.
Figure 13B:
FIG. 13B is a rotated top view depiction of a spring in a particular illustrative embodiment of the present invention.

Turning now to FIG. 3, as shown in FIG. 3 as a front side view of a particular illustrative embodiment of the invention 300, a face mask holder receptacle sides 20 and face mask holder top 22 for receiving and holding the face mask 100 is depicted. A first face mask holder arm 17 and a second face mask holder arm 14 are attached to the toggle mechanism housing by a pair of hinges 18. The face mask holder receptacle top 22 is attached to the toggle mechanism housing 32 with four screws. A face mask holder arm outer tab 19 is formed on the hinged end of the face mask holder arms, to limit outward rotation of the mask holder arms outward into the open position when the mask is removed and disengaged from the face mask holder receptacle sides 20 face mask holder receptacle top 22. Left and right mask holder arm ramp pads 13 are formed on the non-hinged ends of the first and second mask holder arms. A face mask holder receptacle top 22 of the face mask holder receptacle has a rectangular indention 15 formed inside of the mask holder receptacle. The rectangular indention 15 is a hollow protrusion that allows room for the toggle mechanism spring 33 to bend forward during rotation of the first and second mask holder arms during removal of the face mask out of the face mask holder receptacle. When the face mask holder arms are opened the spring bends into the rectangular indention 15. In a particular illustrative embodiment of the invention the face mask holder receptacle sides 20 overlap the face mask seal 2 when the face mask seal is pressed against the interior surface of the face mask holder receptacle. In a particular illustrative embodiment the face mask holder receptacle sides 20 are flared out and away from the face mask holder receptacle top 22 to help guide the face mask into the face mask holder receptacle. The face mask holder receptacle sides 20 and top 22 act as a lid for the face mask when the face mask is inserted into the face mask holder, so that potentially infectious material inside of the face mask is not accessible to others. The face mask holder receptacle sides 20 overlap the face mask seal when the face mask is inserted fully into the face mask holder receptacle sides 20 and top 22. A belt clip having a belt clip top 16 is fixably attached to the toggle mechanism housing 32 (as shown in FIG. 4) is configured for attaching the belt clip and face mask holder receptacle to a person's belt for carriage of the face mask and face mask holder. In a particular illustrative embodiment of the invention, the toggle mechanism spring 33 is a flat spring as shown in FIGS. 13A and 13B.

Turning now to FIG. 4, as shown in FIG. 4 as a rear side view of a particular illustrative embodiment of the invention 400 of the face mask holder receptacle is attached to a toggle mechanism housing 32. The toggle mechanism is spring loaded and used to lock the mask holder arms in either an open or closed position. The toggle mechanism does this by passing through a spring loaded "toggle" point where any force into the toggle mechanism causes the toggle mechanism to maintain its position, either open or closed. When the mask pressed into the mask holder the toggle mechanism forces the mask holder arms to be toggled closed to keep the mask firmly in the mask holder and held in place by the mask holder arms, forming a physical barrier between the potentially contaminated inside of the mask and the general public. For example, when a person coughs openly on a public bus, the bus is recalled and decontaminated, and a replacement bus is provided. One must understand how infection occurs before one is able to prevent infection. The inventor believes that Covid-19 is not spread by talking and breathing but rather by coughing and sneezing which the present invention substantially addresses by substantially containing contaminated particles generated by coughing and sneezing. When the mask is removed from the mask holder, the toggle mechanism maintains the mask holder arms in the open position and ready to receive the mask for reattachment to the mask holder after removal. A pair of spring retention bars 23 hold the toggle mechanism spring 33 and maintain force on the mask holder arms. Face mask holder arm outer tab 19 limits the rotation of the mask holder arms outward away from the mask in the open position. The belt clip holder has a belt clip receptacle 28 for sliding over a person's belt to hold the mask holder and the mask when installed in the belt holder. The belt clip is attached to the toggle mechanism housing by belt clip attachment plate 24. Spring relief space 27 allows the toggle mechanism spring 33 room to bend when the toggle mechanism rotates the mask holder arms. Spring relief space 27 forms rectangular indention 15 inside of the face mask receptacle. Belt clip front surface 29 attached the belt clip to the toggle mechanism housing 32. The toggle mechanism assumes one of two stable positions under the compressive forces exerted on the spring by the toggle mechanism toggle spring receptacle slots 26. A first stable position when the mask holder arms are fully opened and a second stable position when the mask holder arms are in the fully closed position and resting on the face mask holder ramps when the face mask is inserted into the face mask holder. The face mask receptacle serves as a lid or covering for the inside of the face mask to avoid exposure from the inside of the mask to others so that the potentially contaminated inside surfaces of the mask after a cough is not exposed to the public.

Figure 5:
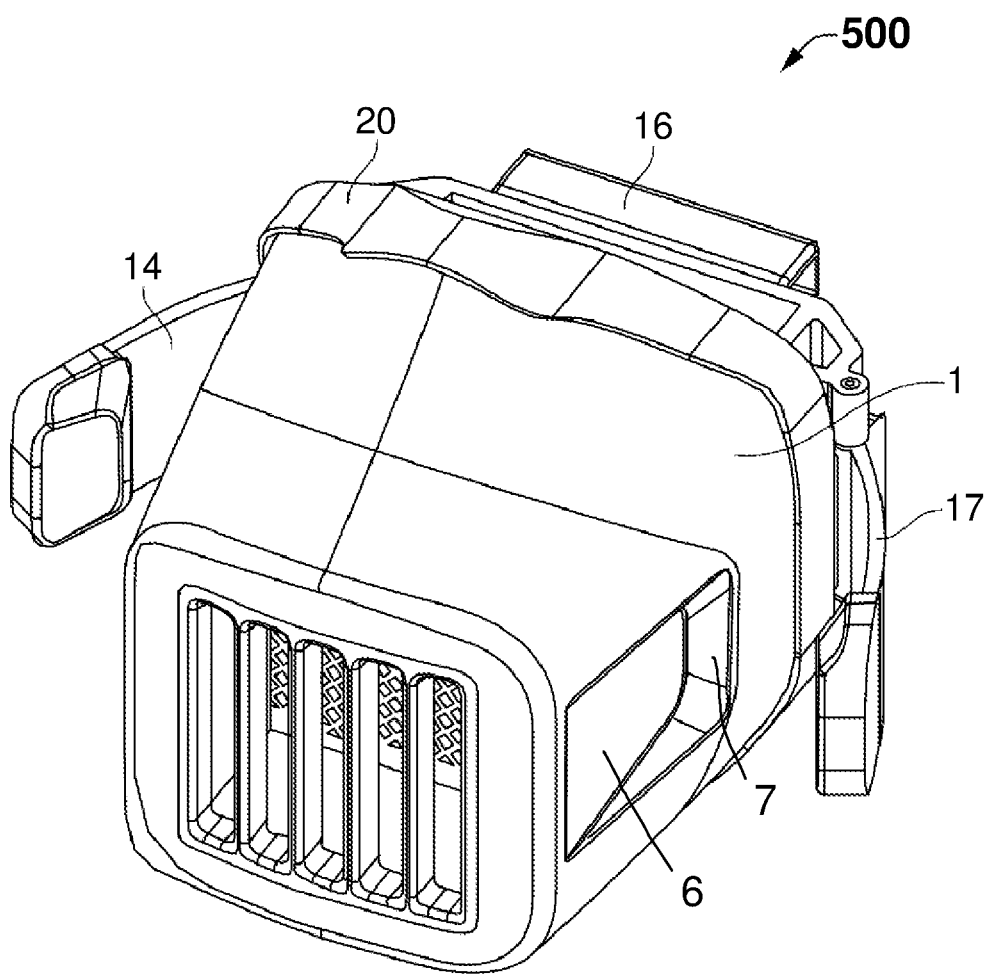
FIG. 5 is a front three quarter view depiction of a mask that is partially inserted into a mask holder with open mask holder arms in a particular illustrative embodiment of the present invention.

Turning now to FIG. 5, as shown in FIG. 5 as a front view of a particular illustrative embodiment of the invention 500, the mask is partially inserted into the mask holder with the mask holder arms held in the open position by the toggle mechanism.

Figure 6:
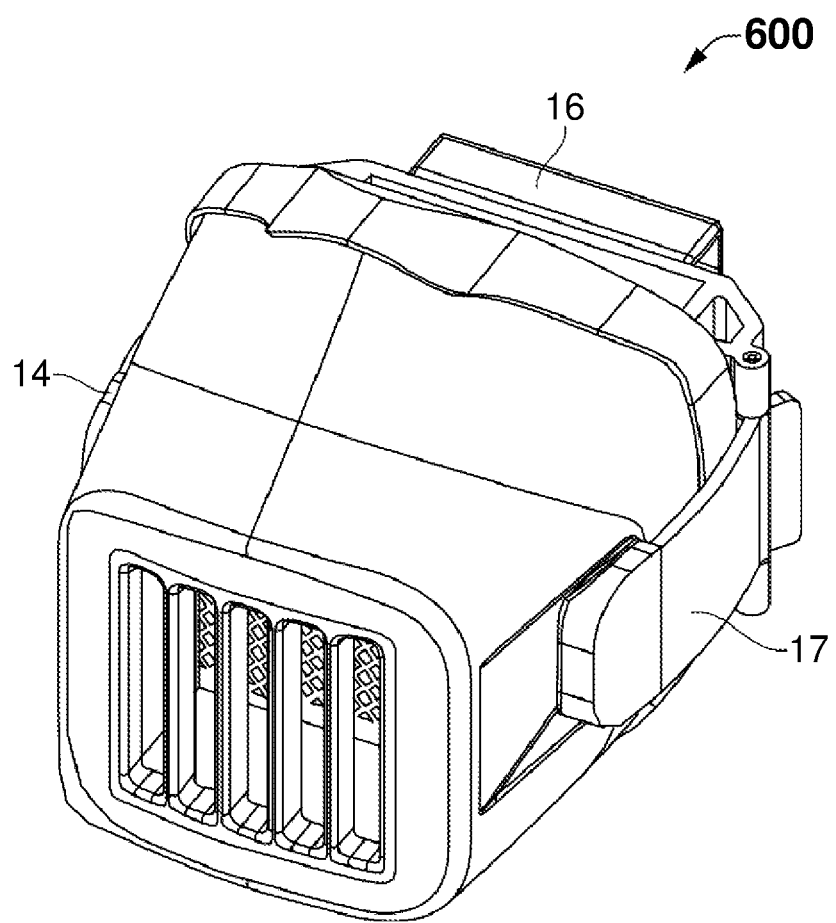
FIG. 6 is a front three quarter view depiction of a mask fully inserted to a mask holder in a particular illustrative embodiment of the present invention.

Turning now to FIG. 6, as shown in FIG. 6 as a front view of a particular illustrative embodiment of the invention 600, the mask is inserted into the mask holder with the mask holder arms held in the closed position by the toggle mechanism. The toggle mechanism forces the arms to the closed position when the mask is fully inserted into the mask holder.

Figure 7:
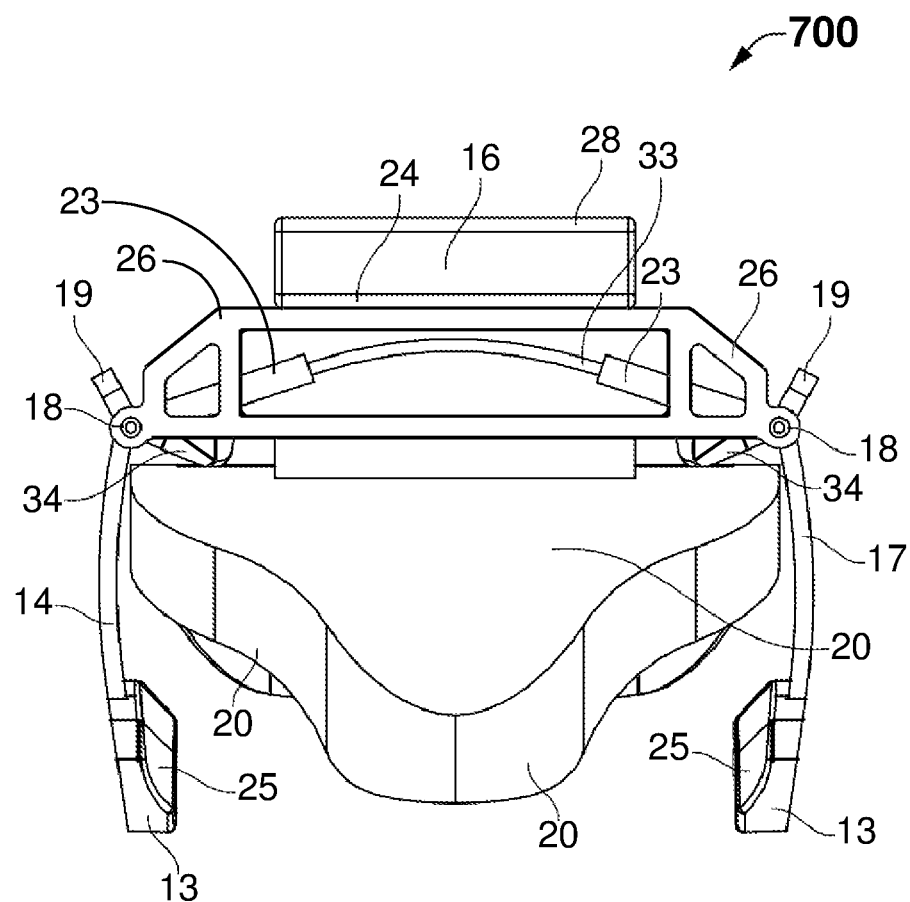
FIG. 7 is a top view depiction of a mask holder in a particular illustrative embodiment of the present invention.

Turning now to FIG. 7, as shown in FIG. 7 as a top view of a particular illustrative embodiment of the invention 700, the mask is inserted into the mask holder with the mask holder arms held in the open position by the toggle mechanism spring 33. Mask arms toggle tabs 34 are forced backward by the mask face seal when the mask is inserted into the mask holder. Left and right mask holder arm ramp pads 13 have an angled surface 25 that mates with and slides over the mask holder arm ramp toggle surface 7.

Figure 8:
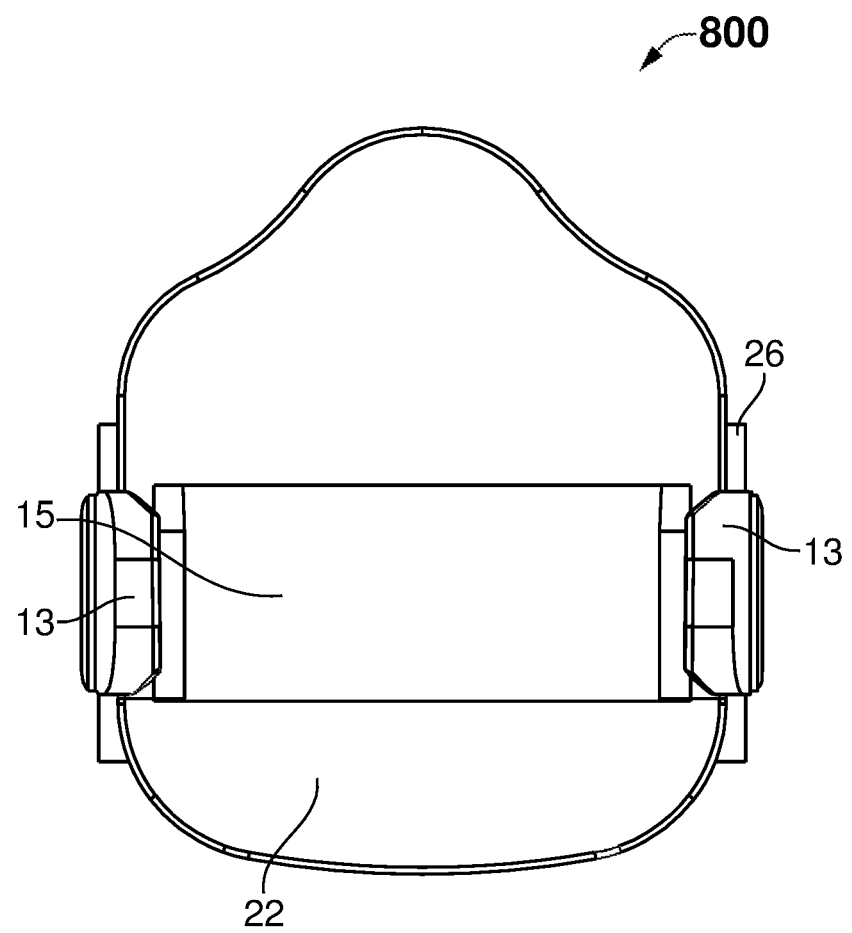
FIG. 8 is a front view depiction of a mask holder in a particular illustrative embodiment of the present invention.
Figure 9:
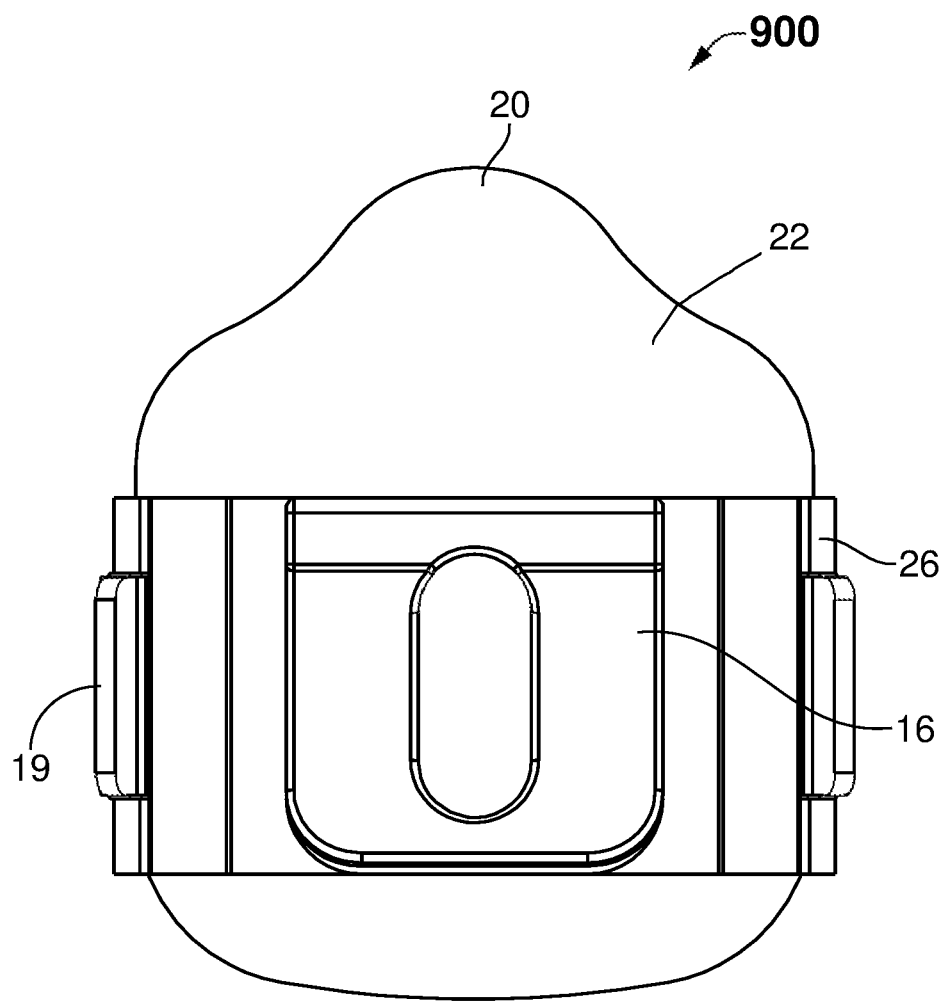
FIG. 9 is a rear view depiction of a mask holder and attached belt clip in a particular illustrative embodiment of the present invention.
Figure 10:
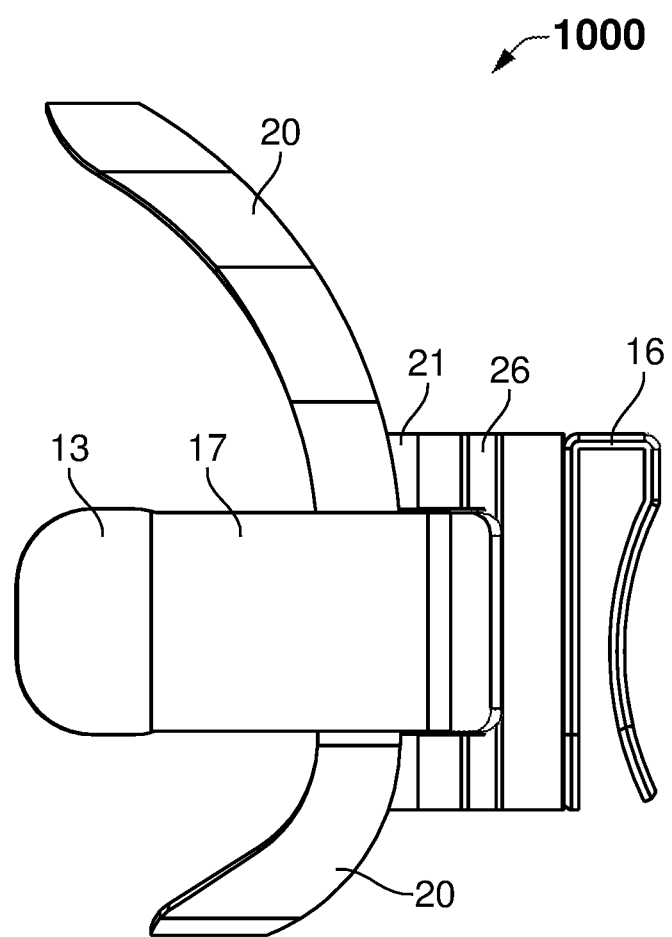
FIG. 10 is a side view depiction of a mask holder and attached belt clip in a particular illustrative embodiment of the present invention.

Turning now to FIG. 8, as shown in FIG. 8 as a front view of a particular illustrative embodiment of the invention 800 is depicted of the mask holder. Turning now to FIG. 9, as shown in FIG. 9 as a rear view of a particular illustrative embodiment of the invention 900 is depicted of the mask holder attached to the belt clip. Turning now to FIG. 10, as shown in FIG. 10 as a side view of a particular illustrative embodiment of the invention 1000 is depicted of the mask holder attached to the belt clip.

Figure 11:
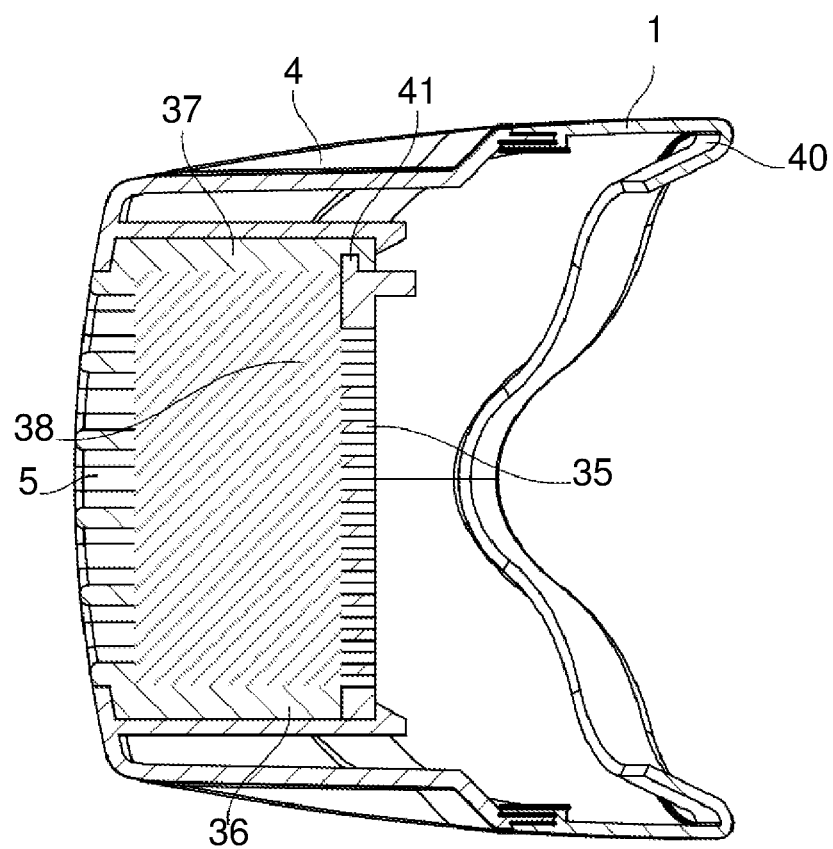
FIG. 11 is a top view depiction of a cross section of a mask in a particular illustrative embodiment of the present invention.

Turning now to FIG. 11, in a particular embodiment of the invention, as shown in a top cross sectional view of the mask, filter holder lid 35 has tabs 41 on each side of the lid that slide into slots formed in two side sections 36 and 37 of the filter holder. The filter holder door is slide out of the filter holder to allow access to an interior of the filter holder to insert or remove an aerosol filter in the filter holder. The filter holder allows a cough or sneeze to pass through the aerosol filter and exit the mask through the air filter exit ports 3 which in a particular illustrative embodiment, vertical oval shaped apertures in the filter holder front 5. The edge of face mask seal folder section 40 of the pliable second section 1 of the mask that covers the persons face is folded inward so that when a person presses the mask to their face the mask forms a better inner pressure seal than a mask having an edge that folds outward.

Figure 12:
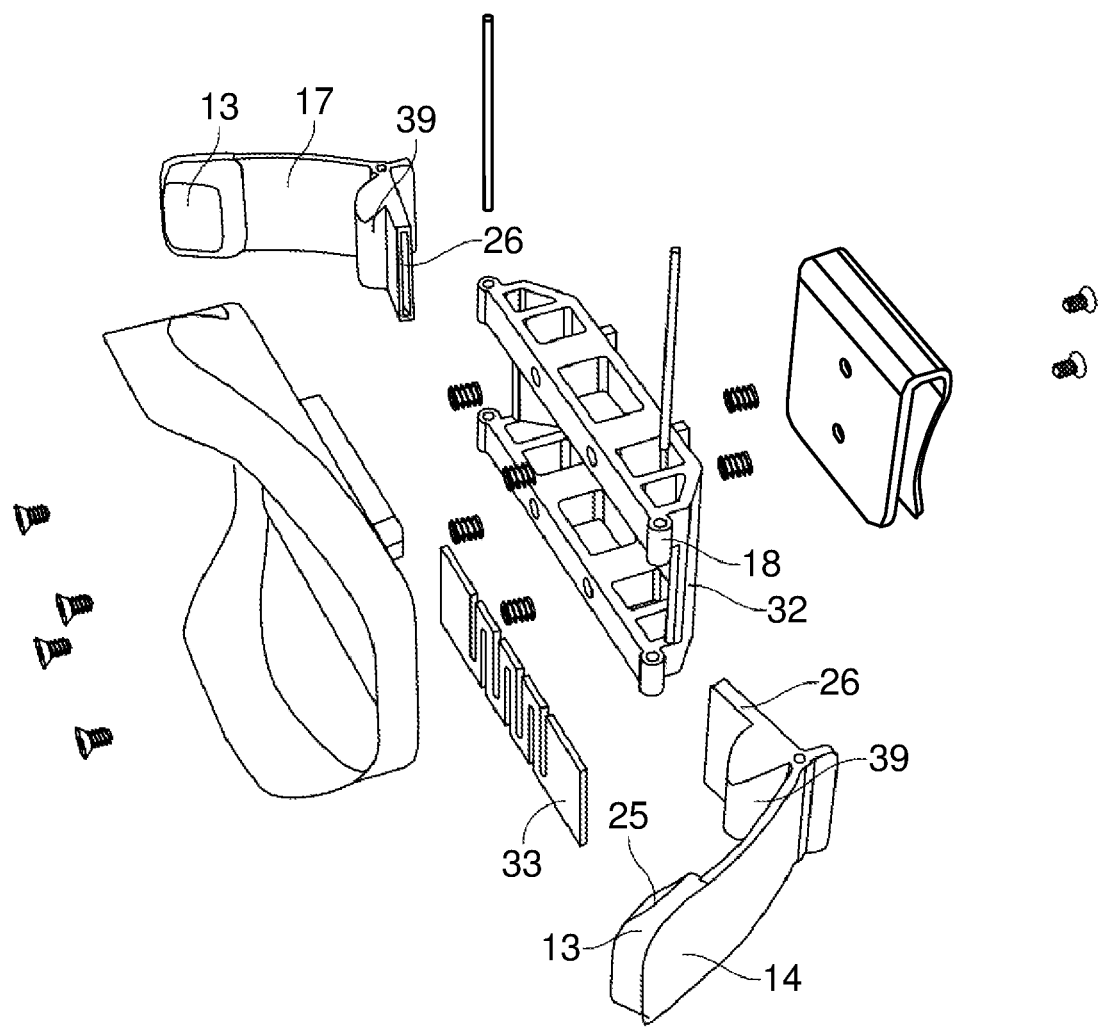
FIG. 12 is a top three-quarter view depiction, of an exploded view, of a mask holder, belt clip and toggle mechanism in a particular illustrative embodiment of the present invention.

Turning now to FIG. 12, FIG. 12 is an exploded view of a particular illustrative embodiment of the invention. As the mask is fully pressed into the mask holder, a force is applied to the toggle surface 39 and this in turn causes the face mask holder arms to partially close and this causes the compressed spring that is buckled forward to instead buckle aft which then forces the arms to snap closed to the fully closed position. As shown in FIG. 12, angled toggle surface 25 is provided on each mask holder arm pad to cause the toggle mechanism to rotate the mask holder arms open and disengage from the face mask as the angled toggle surface 25 slides over mask holder ramp arm toggle surface 7 and stays open or closed under the influence the toggle mechanism spring 33. Toggle mechanism spring 33 fits into toggle mechanism toggle spring receptacle slots 26 formed on the hinged end of the face mask holder arm. The left and right mask holder arm ramp pads 13 are beveled to the same angle as the face mask holder ramp arm toggle surface 7 so that the mask is easily slide in and out of the mask holder 300.

Turning now to FIGS. 13A and 13B, FIG. 13A and FIG. 13B are a front and side view respectively of the toggle mechanism spring 33 in a particular illustrative embodiment of the invention 1300.

Figure 14:
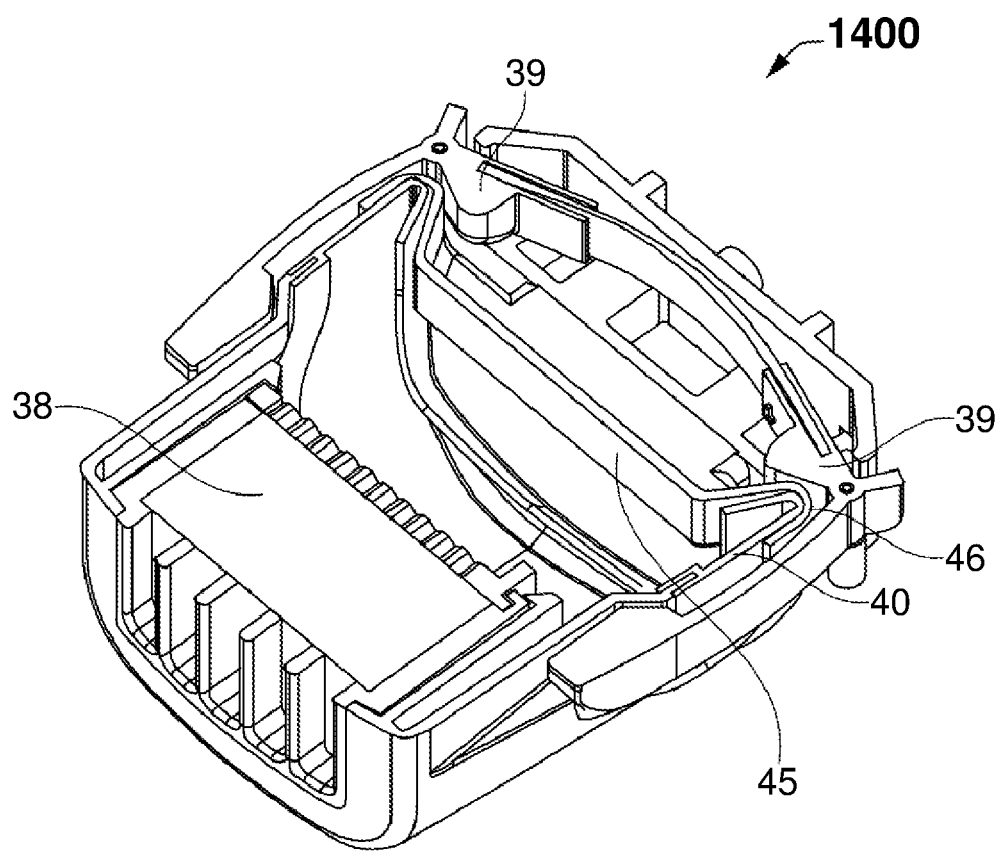
FIG. 14 is a three quarter top view depiction of a cross section of a mask fully inserted into a mask holder in a particular illustrative embodiment of the present invention.

Turning now to FIG. 14, FIG. 14 is top view of a cross section 1400 of the face mask fully engaged in the face mask holder showing the aerosol filter 38 installed in the filter holder. Mask receptable member 45 has a face mask seal engagement member 46 which is curved and shaped like the face mask seal to engage the face mask seal folded section 40 formed by the face mask seal folded section. When the mask is pushed into the mask holder so that mask seal presses on the mask seal engagement member that engages an inner section of the arm toggle member to overcome the force of the spring and rotates the mask holder arms inward to engage the mask holder arm ramps to hold the mask on the mask holder.

Figure 15:
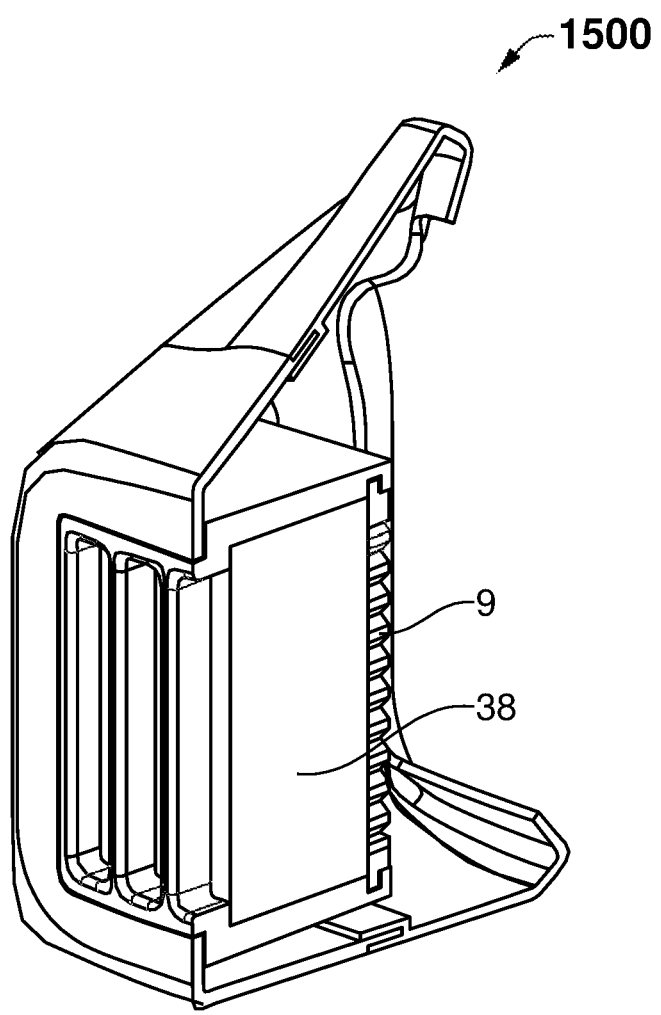
FIG. 15 is a three quarter side view depiction of a cross section of a mask in a particular illustrative embodiment of the present invention.

Turning now to FIG. 15, as shown in FIG. 15, in a particular illustrative embodiment 1500 of the invention the aerosol filter is installed in the filter holder.

Figure 16:
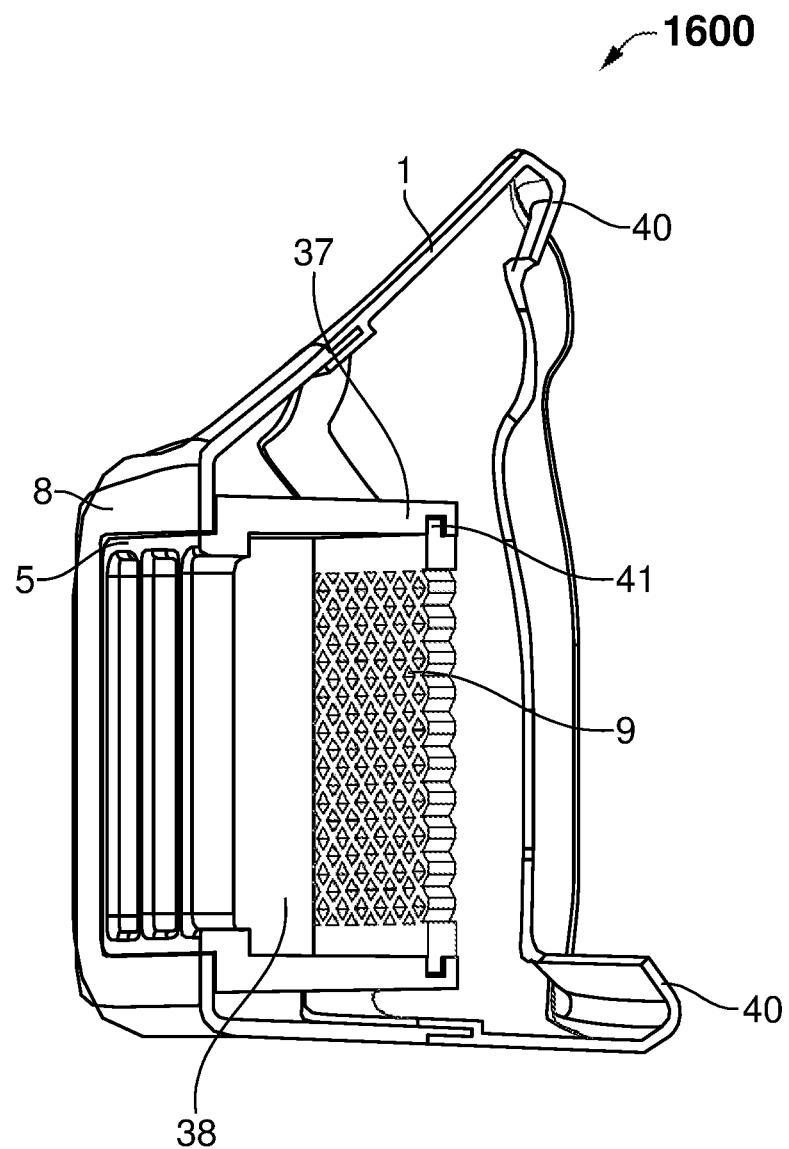
FIG. 16 is a side view depiction of a cross section of a mask in a particular illustrative embodiment of the present invention.

Turing now to FIG. 16, as shown in FIG. 16, in a particular illustrative embodiment 1600 of the invention the aerosol filter is installed in the filter holder.

Figure 17:
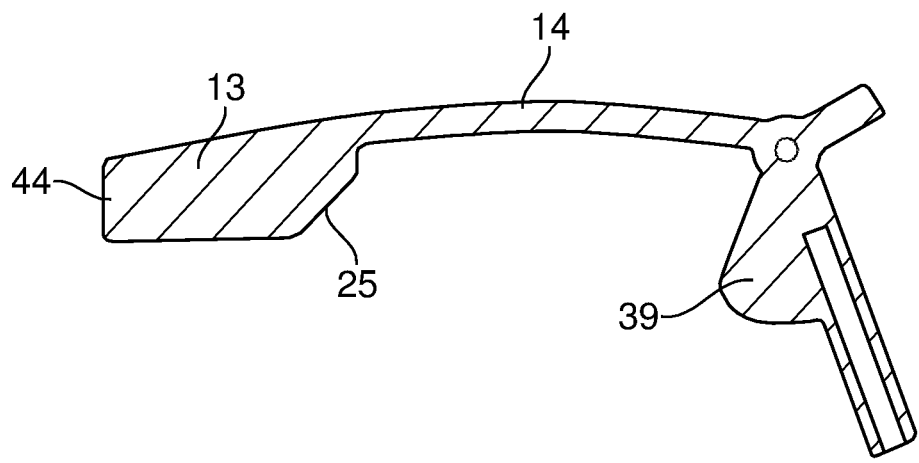
FIG. 17 is a top view depiction of a cross section of a belt holder arm in a particular illustrative embodiment of the present invention.

Turing now to FIG. 17, as shown in FIG. 1, a particular illustrative embodiment of the invention the mask holder arm is depicted. Face mask holder arm tip 44 is formed on face mask holder arm.

Inventor's Statement

Everything we Need to Know about Covid-19Including how its Transmitted and how to Stop it.

How Spreads and how to Stop it

Red=His words Blue=my words Black=narrative

Green=Retrospective analysis strongly suggesting this was a real experience and that He only spoke the truth.—For fewer interruptions, this can be skipped on first read.

On the morning of Saturday Mar. 21, 2020, I woke up feeling good and well rested. My wife and I were planning to take our children ages 4, 6, 9, and 16 on a spring break trip this morning. Everyone was still asleep, so I laid on my back and quietly waited to assure everyone was well rested for the long drive ahead. At 62, it has been many years since my wife convinced me to stop sleeping on my back because, as she put it, I "stopped breathing for a long time." However, as I waited this morning, I accidentally fell asleep on my back.

Shortly afterwards I awoke somewhere else. As best as I can describe it, I was in a volume of space with a grayish cloud-like appearance and a visibility of just a few feet. I was comfortable and calm. I felt good, I was fully awake and alert, and my mind was sharp. The experience felt natural and somehow familiar. As I wondered why I was there, I felt a presence above me, beyond my visibility.

He allowed me to come up and greet him. It was a good friend of mine, whom I had known for a very long time, including multiple lifetimes. He was a more advanced being than myself and I was happy for His visit, but the greeting did not last long. To my disappointment the reason for his visit was a grave world issue, and He sent me back to "the void" to await a "seminar" based on this issue. I believe the "void" was a better place to receive shocking news.

We communicated through what seemed like "soundless" words, telepathy, visions, and "field trips." There were no physical sound waves between us, but it felt as if my brain processed signals from the nerves in my ears, just the same. Words were superimposed with more meaning than is normal. In addition, if there was something he needed to show me, a vision appeared, or I was sent to another place and/or time to actually witness it firsthand. The entire experience seemed to last anywhere from several hours to a whole day; It was hard to judge time lapsed.

Many Near Death Experiences (NDE) involving higher beings report intense waves of love and/or spiritual lessons. My NDE was nothing like that. It was more like a medical or engineering seminar designed to prevent a specific apocalyptic event. There were many specific verifiable predictions of the future; Some have occurred, and some will occur soon for everyone to personally witness. On a personal level, there was tons of information I was unaware of, but later verified.

In the face of such overwhelming evidence, I gave up my career as an orthodontist to concentrate on avoiding the end of our civilization, on a non-profit basis. This was not an easy decision. We have nine children, including 2 just starting college and 4 (ages 4, 5, 9, and 16) living at home. In addition I had just splurged on my dream office building; In fact, construction had just ended three months prior. By way of brief introduction, Prior to graduating from Baylor College of Dentistry I worked at NASA JSC re-entry aerodynamics and Lockheed Martin, wind-tunnel dept., received a BS Aerospace Engineering (also completed 90% requirements for B.S. electrical engineering) University of Texas at Austin.

The seminar started with a simple, yet concise opening statement: "There is a problem."

It sounded serious, like perhaps a nuclear war or something.

He was definitely right. COVID-19 is a huge world problem now. In March 2020, I had absolutely no clue of what He was talking about, so I asked, in a confident, carefree tone, "What's the problem?" Due to the shocking information given throughout His seminar, He mostly spoke slowly and deliberately to avoid any miscommunication; Furthermore, He often used tone and pauses to emphasize the veracity and importance of each individual phrase within a sentence.

"Everything . . . y'all are doing . . . and will do . . . with the coronavirus . . . is going to fail."

He predicted the future accurately. Recent linear regression analysis suggests COVID-19 is showing no signs of abatement, worldwide. (I believe He spoke with a Texan dialect because I am Texan). That blew my mind; I did not see that coming. At the time, I thought the coronavirus would eventually die out like SARS and MERS. In a puzzled tone I asked, "Why?" He replied in the same manner:

"Because y'all have the wrong approach." "Why is it the wrong approach?" "Because that approach cannot stop the coronavirus . . . . It's the same approach y'all have had with the flu."

He is correct. After studying a bit, I realized we are approaching COVID-19 with the same playbooks we have used previously with the flu i.e., vaccines, masks, social distancing, and quarantines (we used masks, social distancing, and quarantines in the flu of 1918). I was very proud of the United States' flu vaccination program, so in a puzzled tone I asked, "Haven't we been successful with the flu?" He said, "No . . . Y'all have merely been able to "get by" with the consequences."

Meaning, being able to survive, and even thrive, in spite of the flu burden has given us a false sense of success. Here success is defined as eliminating the flu; He was not only saying eliminating the flu and the coronavirus was possible, but He was also saying it should be our goal. This struck me as odd because I was brought up believing eliminating the cold and flu was impossible.

He predicted the future big time. (If anyone is interested, I have proof of His words well before this happened). After a strong 2019/20 flu season, many epidemiologists warned the flu might return strong during the 2020/21 flu season and even superimpose synergistically with COVID-19 to produce "comorbidities." Epidemiologists were taken completely by surprise that the flu basically disappeared worldwide. This has never happened before. https://www.scientificamerican.com/article/flu-has-disappeared-worldwide-during-the-covid-pandemic1/This predicted world event strongly suggests that eliminating the flu is possible and, with the right approach, so is COVID-19.

He was correct again. Researching later, I discovered the flu vaccine merely reduces illness and death, just like seat belts merely reduce automobile fatalities. More specifically, the flu vaccine has prevented (only) an estimated 12% of all flu deaths during the last 9 years of data on CDC's website: https://www.cdc.gov/flu/about/burden/index.html It is not for a lack of trying;

We have attempted large scale, yearly flu vaccinations for over 80 years. Believing that stopping the flu was impossible, we settled on learning to "live with the flu."

We like to point to many successful mass vaccination programs as evidence that vaccines are the right approach for COVID-19. In May 2021, I found all these successful mass vaccination programs involved slower mutating bacteria and viruses. Generally RNA viruses mutate faster than DNA viruses and some RNA viruses mutate faster than others. The cold, flu, and COVID-19 are all faster mutating RNA viruses. https://www.sciencedirect.com/topics/medicine-and-dentistry/mass-immunization Trying to vaccinate the entire world against a fast mutating virus is like a dog chasing its tail.

In four months, we have vaccinated just 4% of the world for COVID-19: https://ourworldindata.org/covid-vaccinations At this rate, it would take 8 years to vaccinate the entire world . . . but in the meantime, mutations would require us to start all over again. In addition, let us not forget Vaccine Effectiveness (VE), Case Death Rate (CDR), and the Basic Reproductive Number RO can all vary wildly from year to year; Especially with a brand new virus like COVID-19 that has not had time to adapt to the vaccine.

The naturally lazy part of me desperately desired to avoid a huge, world-wide paradigm shift in our approach to the coronavirus. I brainstormed hard and asked: "Why can't we just continue "getting by" with the wrong approach?" He replied:

"Because the coronavirus is different.

He was definitely right, in a huge way; Oh yea, the coronavirus is different all right, very different. I sensed He was struggling to help us without giving us too much knowledge; He was holding back vital, but unreleasable, information. However due to the dire straits we are currently navigating in, I shamelessly pried: "How so?" Still holding back, He guardedly replied, "It's more infectious . . . and it's more deadly . . . .

He was exactly right. These were the main differences we were aware of, on Mar. 21, 2020.

. . . and that is just what y'all know so far.

He was also right: Since March 2020, we have discovered many more ways in which COVID-19 is "different." Diabolically different. Surprised, I continued to blatantly pry: "There is more?" He paused for a moment to find just the words that could help us without "spilling the beans" and very guardedly replied, "Let us just say . . . the coronavirus will keep giving y'all surprises.

He seriously predicted the future here. We have had a string of surprises of how coronavirus symptoms are "weird", different, and clearly more serious than the flu. (Again, if anyone is interested, I have proof of His predictions before they happened.) "For how long?" Being intentionally vague He said:

"For a long time."

I pressed further and I received visual numbers of 12 to 18 months, or longer.

Again, he predicted the future accurately. It has been one year, and we are still receiving bad surprises from COVID-19. Basically, I felt he was trying to tell us: "Y'all don't even know what y'all are dealing with yet!" [In retrospect, what He really trying to tell us was: "Y'all are like Custer confidently riding up the hill to his last stand."] Still being lazy, I asked: "What about the vaccines? Won't they take care of the coronavirus? He replied:

"The first vaccines will not work." I sensed that He could not tell us why.

He has been right so far; the first vaccines were not released in time to "work" during the last (2020/21) COVID season. In particular, the sudden fall of COVID-19 cases last (2021) winter (USA) was due to a seasonal COVID-19 pattern (identical to a seasonal flu pattern). The sudden fall was not due to vaccines because it began when 0% of the US population was fully vaccinated. Compare https://ourworldindata.org/covid-vaccinations with https://ourworldindata.org/covid-cases.

The first true test of the vaccines will naturally be during next (2021/22) COVID season; The "Wuhan Virus" strain of December 2019 is the strain used to formulate the vaccines. This strain of COVID-19 is no longer circulating and will be two years old during the next COVID season.

Mutations, like the South African and Brazilian mutations, are already starting to evade the immune system and are able to infect those who have been vaccinated as well as those who have been previously ill with COVID-19. As of Apr. 30, 2021, we have recorded 10,000 of these "breakthrough" cases among a population of 100 million vaccinated Americans. Mathematically, this is very similar to when on Mar. 19, 2020, we had 10,000 cases of COVID among a population of 330 million . . . https://www.newsweek.com/this-chart-number-covid-vaccine-breakthrough-cases-U.S. Pat. No. 1,595,124 Mutations against a vaccine are more likely to occur and survive in a partially vaccinated population; Therefore, as countries like India with high infection rates begin to vaccinate their populations, we are actually more likely to see mutations against our vaccines emerge. https://www.independent.co.uk/news/science/covid-variants-mutations-vaccines-latest-b1832152.html This floored me! In true disbelief, I asked "Come on, really? They are not going to work? At all? To reaffirm there was no mistake at all, He repeated exactly: "The first vaccines will not work . . . " Then He elaborated:

" . . . Y'all will keep trying . . . "

That sounds like us, we do not give up. " . . . and eventually . . . "

That sounds plausible, perfecting a new vaccine could take some time.

" . . . y'all will get the effectiveness up to between 10% and 30% . . . " At the time that sounded like a lowball estimate.

However, after later researching, I discovered His COVID-19 VE predictions of 10% to 30%, are actually very realistic. We have over 80 years of experience with massive annual flu vaccinations, yet our current 6-year-rolling-average of the flu VE is a modest 37% and during the 2004-2005 season, the VE was just 10%, according to CDC's website: https://www.cdc.gov/flu/vaccines-work/effectiveness-studies.htm.

" . . . And that's not enough to stop the Coronavirus."

After looking into it, I discovered He was right, 10% to 30% VE is certainly not enough to stop the Coronavirus; As evidenced by the 2019-2020 flu season, during which the flu vaccine VE was higher than average, 45%, and we had a worse than average flu season.

I still couldn't believe the first vaccines would not work and the eventual effectiveness seemed like a "low ball estimate", so I pressed, "How is that possible? They say the vaccines have been started and should be ready within a year." He elaborated further:

"Yes, you are right, the first vaccines will at first look like they will work . . . and then they will not." (I can only guess as to why they will not work: perhaps breakthrough mutations so profound that a simple reformulation of the vaccines is not possible.)

He is right again: We do have multiple "first vaccines" that are looking like they will work during next COVID season.

In past years, flu vaccines have looked like they were going to work at the beginning of the flu season, but by the time the flu season got well underway, the VE was much less than anticipated because a different strain took over midway through the season. The COVID season still is a long way off and many more mutations are sure to emerge before it is all over. In a way, it is actually a disadvantage that we have vaccinated before COVID season because it gives specific mutations against this vaccine more time to emerge and grow in circulation strength.

I knew my friend well enough to know He could never lie, and I could not come up with any other options. After a long pause I shifted from denial to solution and asked "Ok, so what exactly is the right approach?" Enthusiastic that I was now onboard, He began first with how its spreads: https://www.cdc.gov/csels/dsepd/ss1978/lesson1/section10.html "This . . . "THING" . . . comes out when y'all cough and sneeze. By the long pause after the word "this", I understood He was struggling to describe it truthfully without spilling the beans of it is true identity. From his tone and the descriptor "thing" I understood COVID-19 was disgusting, evil, and likely synthetic.

He gave me a slow motion fluid-flow-visualization of a cough. With high internal dynamic pressures, copious amounts of mucous particles are sheared off the mucous linings of the respiratory system, aerosolized, and sprayed out the mouth, and caught by the "Mask."

He was perfectly correct: According to the CDC, epidemiology 101 dictates we must first understand the infection cycle (including transmission) and then determine what part of the infection cycle (in this case transmission) is most susceptible to intervention. (This is why He took it upon Himself to explain transmission before answering my question on intervention.) He just told us the mode of transmission of COVID-19 is coughs and sneezes. Period. It is crucially imperative to dispel the incorrect notion that speech and breathing cause infection.

Because it has been recently demonstrated that breathing and speech also produce aerosols containing RNA (in addition to coughs and sneezes), many well-meaning people assume it is wise and safe to cautiously proceed as if normal breathing and speech also cause infections too. How can it hurt, right? Ironically and sadly, this well-meaning assumption will go down in history as the deadliest assumptions ever made. This assumption sends us barking up the wrong (transmission) tree and therefore leads us away from the correct (intervention) path. To quote the World Health Organization's (WHO) website: The presence of viral RNA (in aerosols) is not the same as replication- and infection-competent (viable) virus that could be transmissible and capable of sufficient inoculum to initiate invasive infection.

For years, the CDC and the WHO have studied SARS, MERS, and later SARS-CoV-2 transmission. When a person's test came back positive and that it was determined that person had been at a restaurant while waiting for test results, the CDC and WHO used restaurant credit card records to contact customers who were at that restaurant at the same time. With this information, they were able to produce a seating chart showing who sat where and when relative to the infected individual. They followed up with weekly testing and determined which of those patrons got sick and who did not. What they found was surprising. Only those who were seated within three feet from the infected individual ended up getting sick . . . even if they were seated at the same table. These results were amazingly consistent throughout the U.S. and the world.

This is why the WHO recommends three feet of social distancing. Many countries add a margin of safety to account for rare situations such as local indoor air currents. Most countries have between a three to six foot rule. The CDC recommends six feet because the USA is not as crowded, and it wants a greater margin of safety. https://apps.who.int/iris/bitstream/handle/10665/337199/WHO-2019-nCov-IPC_Masks-2020.5-eng.pdf?sequence=1&isAllowed=y.

The CDC has maintained, for decades, that epidemiological evidence strongly suggests that the flu, MERVS, SARS, and then COVID-19 infections are mainly caused by coughs and sneezes and that a (critically) large viral load is required to cause infection. While it is true that aerosols are produced by breathing and speech, these aerosol particles are of smaller size, of fewer particles, of a different particle composition, and of different aerosol dynamics. Many well-meaning people, who notice breathing and speech occur much more frequently than coughs, assume the smaller viral loads can be "saved up" and accumulated over time to produce an equivalent viral load as coughs and are in fact responsible for infections that have traditionally been attributed to coughs. This is analogous to assuming that because gentle summer breezes occur much more frequently than hurricanes, the effects of gentle summer breezes can be saved up and accumulated over time to produce hurricane level disasters and are in fact responsible for hurricane disasters. Multiple aerosol studies have shown cough aerosol plumes project much further than three feet. This clearly shows that patrons seated at four feet away repeatedly receive smaller viral loads, however, empirical epidemiological data also clearly demonstrates that those patrons do not get sick. This clearly demonstrates that time is a factor to infection; You cannot save up smaller speech viral loads to create an equivalent (critically) large cough viral load. A minimum, large viral load is needed all at once, for infection to occur. The immune system is capable of fighting off a small viral load attack in such a way that it is continuously ready for the next small viral load attack. This clearly demonstrates breathing and speech aerosols do not cause infection. Only coughs, and sneezes with aerodynamic forces at least one hundred to a thousand times higher than breathing and speech, can deliver a (critically) large viral load in one wave. https://news.mit.edu/2014/coughs-and-sneezes-float-farther-you-think A recent scientific article mathematically shows that it is statistically impossible for small aerosol particles, such as those created by breathing and speech, to carry more than minute numbers of the SARS-CoV-2 viruses. https://rd-cu.be/ckb8H By inputting established COVID-19 patient viral loads and known SARS-CoV-2 virus size into Poisson's Ratios, Dr. W. S. Mayya et al. mathematically demonstrates that only aerosols larger than 20 microns, before desiccation, are statistically capable of carrying a significant amount of the SARS-CoV-2 virus. He further sites other studies that find normal breathing and speech aerosols are generally less than 1 micron in diameter before desiccation. Severely ill patients have viral loads that are several orders of magnitude higher and are able produce breathing aerosols with a significant number of virus laden particles. However, these patients are typically intubated and quarantined (in ICU hospital wards) and are not involved in ambulatory public activities. Dr. Mayya is easily one of the world's top aerosol scientists.

It is widely accepted that aerosols larger than 5 microns land in the host's upper respiratory system and smaller particles land in the lower respiratory system or are re-exhaled.

Coincidentally, COVID-19 infections generally begin in the upper respiratory system; Lower respiratory infections are generally a progression from an initial upper respiratory infection. (I have not been able to confirm this in any study.) This demonstrates that only larger aerosol particles, larger than 5 microns, (from coughs) cause infection.

Cough and breathing aerosols are created very differently. Because Internal velocities produced by coughs are at least ten times faster than internal velocities produced by normal breathing . . . and because aerodynamic forces are proportional to the velocity squared . . . internal aerodynamic forces produced by coughs are at least one hundred times stronger than forces produced by normal breathing. (By a similar analysis, sneeze aerodynamic forces are at least one thousand times stronger.) This gives coughs and sneezes a unique ability to dig into the mucous linings. Therefore, cough and sneeze aerosol composition, turbulent flow patterns, and ability to cause infection are in a class of their own.

Recent studies ridiculously try to show there is little difference between a cough and a breath. They conclude both aerosol plumes slowed down very quickly and eventually dispersed throughout the room, so they must have a similar ability to cause COVID-19. This is analogous to shooting a rifle and a BB gun into a lake and conclude: they both slowed down very quickly, and both ended at the bottom of the lake, so they must have a similar ability to cause death.

It has been shown that asymptomatic patients cause some infections. If we assume asymptomatic patients never cough, we must conclude these infections are caused by breathing and speech aerosols. However, a study https://erj.ersjournals.com/content/41/1/241 shows that we cough even when we are not sick. Sometimes we cough when we swallow wrong or when foreign particles tickle our throat, etc. This is the normal immune system in action. In fact, by using full-time digital monitors, this study shows we cough an average of 23 times per day. These coughs are so part of our human experience that they go unnoticed, by us and by those around us, making these coughs "stealthier" and more likely to cause infections.

"Asymptomatic" is not a precisely defined term. The same study above shows symptomatic patients cough an average of 323 times per day. Clearly asymptomatic patients cough somewhere between 23 times per day and 323 times per day.

Some say higher infection rates at Gyms and Choir practices cannot be explained by coughs and sneezes. This is false. It is well known that exercise and singing increases the likelihood of "normal" coughs. I argue that this is even more true with "asymptomatic" patients. Again, the condition "asymptomatic" is not a precisely defined condition.

Furthermore, faster, and deeper breathing by hosts in gyms and choirs clearly increase aerosol filtration and deposition rates in the respiratory system.

In the most famous super spreader event, the choir practice in Skagit, Wash., a symptomatic COVID-19 patient socialized before, after, and during a cookie and drink social break—including hugging, and the entire event lasted two and a half hours. A symptomatic COVID-19 patient cannot go long without coughing, especially with additional irritation from singing. Undoubtedly, countless coughs were produced. Furthermore, due to stadium seating, one person can cough onto many below. Additionally, choir practices are typically held during off hours and to save church funds, the HVAC is typically not operated normally, if at all.

To quote Isaac Newton, "We are to admit no more causes of natural things than such as are both true and sufficient to explain their appearances. Therefore, to the same natural effects we must, as far as possible, assign the same causes." Hawking, Stephen (2003). On the Shoulders of Giants. Running Press. p. 731. ISBN 978-0-7624-1698-1. Retrieved 24 Feb. 2016 Then he continued.

This is when y'all need to stop it. Once y'all let it out, it is too late. Afterwards there is nothing anyone on earth can do to prevent its eventual outcome." He is right again. Clearly, the best place to capture viruses is at the source. First, cough aerosols are at least one thousand times more concentrated just before release than after release. Second, catching a cough takes one thousand fold less. Wearing a face mask takes 8 hrs./day. Catching a cough, with hygiene measures included, takes about 20 seconds; This ratio of time is at least one thousand fold also. Therefore, catching the virus at the source is one million times more efficient than after release. (One thousand x one thousand=one million.)

Studies show face masks protect others more than the person wearing them. This means wearing a face mask during those seconds of coughing is more effective than wearing the mask the rest of the 8 hour day. (A single cough lasts about one half second). This is strong evidence that source control is very effective. Source Control is like "kryptonite" to transmission. Recall that a large viral load is needed to cause infection, therefore source control only needs to capture some viral load to be effective. We have never realized this because we have just never tried source control in earnest with a specialized tool.

We do not even know what we are dealing with yet; We are seeing all kinds of devilish ways COVID-19 can hurt us. We know these symptoms can sometimes last long after the disease. We simply do not know if some level of disease is permanent, or perhaps reoccurring like the herpes virus. The wisest and safest strategy is to use source control to prevent COVID-19 altogether.

It took me a while to fully wrap my head around just some of the benefits of this simple, yet elegant solution. This brings to mind a problem-solving principle taught in engineering school: "The simplest solution is probably the right solution." https://en.wikipedia.org/wiki/Occam's_razor "Y'all use this approach with environmental hazards." As examples, He showed me visual images of:

1) A leaking undersea oil pipeline.
2) A chemical plant leaking chemical wastes into a river.
3) A nuclear power plant leaking radioactive aerosols.

Note: As in all these examples, successful source control requires specialized tools.

"Y'all know the correct approach is to stop these pollutants at the source because once you let them out, you cannot prevent the final outcome." I asked: Wait, is COVID-19 an environmental hazard? He said" Yes. COVID-19 is a human toxin. It must be stopped at the source too.

He is certainly right. It is common knowledge the best strategy is to stop spilling toxins at the source, ASAP. The CDC calls this strategy "Source Control." I asked, "Aren't we doing that (source control) already by coughing into the inside of our elbows, Kleenexes, and face masks?" This question upset Him, and He suddenly became angry:

"Y'all aren't even trying! If y'all were to try . . . the first thing y'all would do is make a special Mask to stop this thing! Isn't that what y'all do on earth? Make special tools for everything? He was right again. We humans do make special tools for everything. (In fact even to separate my kid's stuck LEGOs! Surely COVID deaths are more important than stuck LEGOs, LOL!) He is also correct because elbows, Kleenexes, and face masks are not specifically designed for Source Control. We have never bothered to make a special tool to capture cough aerosols.

I replied, "Surely we've done that already." Still angry He said, "Show me." I could not recall such a Mask, so I said, "Give me a minute." I mentally went through all the masks I had seen in my life: From the time I was a toddler in my dad's dental offices, to when I worked in a fighter jet factory, to when I was a dental student in the lab, to when I worked in my dental office, and then my orthodontic offices. (In retrospect, I am surprised how patiently He waited on me.) Finally, I said "Ok, I've never seen such a Mask, but surely it's available somewhere around the world." "Still angry, He said:

"In the history of humanity . . . that Mask . . . has never been made." He was right again. A patent attorney did a world-wide search and found that the closest masks to the Cough Mask are basically a modified disposable face mask and a modified disposable Styrofoam cup. Nothing as sophisticated in terms of effectiveness, reliability, durability, ease of use, and total life cycle costs. His Mask is adequately designed for world-wide distribution and is designed to be used on a permanent basis. It took me a long time to understand the subtle design features in His Mask and there may be some I still do not fully appreciate.

(I must say, when He got "angry," there was nothing negative about it. Quite the opposite, His "anger" gave me clarity and understanding; It spoke directly to my heart; It quite literally permanently changed my life. There was not any pressure or fear involved, on the contrary, it displayed how much He loved me, us, and this world. I can finally understand why, in the biblical story of Jesus getting "angry" and turning over the tables of the money changers, that no one attacked Him or even tried to stop Him; Quite the opposite, they were amazed, and many went up to Him afterwards for healings.)

My jaw literally dropped. For decades we have known coughs cause millions of deaths from respiratory infections and we have known source control with specialized tools is the most efficient approach. Why haven't we made a tool for that?

I thought it might be difficult to convince someone else to make the Mask, so I asked Him "What would such a mask look like?" He was delighted to bring me the Mask and show it to me from all angles. The Mask floated to me in a puzzling flight path. I was not sure why. The Mask design seemed simple enough for a novice to bring to market. So, right then and there, I made a solemn vow to bring that Mask to market. (I still stand 100% by that vow.) As I reviewed my future plans, I asked "Ok, so let's say we now have that Mask; How do we best use that Mask to stop COVID-19" He was clearly delighted with my decision. He smiled and cheerfully spread his arms apart, palms up like He was just about to unveil something brand-new and amazing and said:

"Look and see." His mannerisms had a very distinctive Mediterranean flair.

Suddenly, I was shot like a cannonball at great speed to another place and time. I had little perspective of where I was going; As I wondered about this, suddenly time re-wounded and I was able to watch the "cannonball shot" back from the beginning but from a stationary perspective behind and to the right side of my original position. I had a bluish-white trailing light tail as I followed a standard parabolic, projectile trajectory.

I seamlessly appeared, in an empty left aisle seat, in the middle of a moving city bus during morning rush hour. The bus was about full and about a dozen passengers were standing at the front of the bus, anticipating their stop.

I had a very strong sense that I was actually there. The engineer in me tested this perceived reality by closely examining my environment. Each of the various conversations around me sounded original and real. Through the bus windows I checked out fine details of the people walking on sidewalks . . . they all checked out with individual faces, individual personalities, and uniquely dressed. I checked out the variations in architectural details of buildings as we passed by. I noticed the bus accelerations coincided with engine pitch changes as the automatic transmission went through its gears. I tested motion blur with quick turns of my head. I rated my vision acuity. I could not explain why these last two parameters were actually of higher quality and clearer than in normal life. I was fully awake, feeling good and well rested, alert, clear minded, and thinking very logically. I concluded I was actually there; This was not just a high quality simulator. (I still stand by that conclusion). My next question was: "Where am I?" So I got out of my seat and stepped up to the guy sitting in the row in front of me and asked him "Hey, where are we?" He did not respond at all, so I tapped him on his right shoulder and asked again "Hey, where are we?" Again I got absolutely no response. I wondered if he were too busy talking to the man on his left or if no one could hear me, feel me, or see me? I noticed the guy across the aisle was looking straight forward, so to test, I got directly in his field of view, jumped up, shot up my arms, and yelled "Hey!" When he did not bat an eye, I looked down to examine my body and noticed I had no body. I could not understand this because I felt like I had a body, plus I felt healthy, energetic, and good. Apparently, I was just a little blueish-white light orb located in what would normally be the middle of my body, behind my sternum, (relative to the location of my "eyes").

As I worried about my situation, I suddenly had memories of multiple "lives" without a body way before this life. They gave me comfort and I knew it was ok not to have a body. I was also informed I had to go back to my body after my "seminar" ended. All in all, I was able to put the "no body" issue completely out of my mind. I sat back in my seat and continued to explore my surroundings.

To the left of the man in front of me, was a super exhausted man, half asleep, slouching against the window and taking up two seats. As I wondered why, I immediately had a bird's eye view of prior events in his life that explained why he was tired. Again, I felt like I was actually there. In New York City, new COVID-19 cases and death rates had skyrocketed to surreal levels (multiple times higher than our peak in January 2021). Hospitals were overrun and on the verge of collapse. Over 90% of those needing hospitalization for COVID-19 were simply turned away outside the ER entrance, because there simply was not enough capacity. This of course also greatly increased the patients' chances of dying. All outside hospital doors were kept locked, some even chained to prevent desperate break-ins for treatment.

As I explored the city, I noticed vaccines were still being offered, but few people were getting them and I asked, "Why is that?" I was shown numbers indicating currently available vaccines were between 5% and 15% effective. I said "Well, that's better than nothing, why not take that?"

I was shown a man taking a bus and a train to a clinic for a vaccine. By the time he went indoors for the vaccine, took a bus and a train back, and entered his home, he had COVID-19. The virus was now so ubiquitous and infectious that his chances of getting infected while out getting vaccinated was about 8%. (That is a huge number for one errand!) For these reasons, most people felt getting vaccinated was not worth it. The very few people who did get vaccinated mostly drove their own car.

There was wonderful news on the horizon: It had been discovered that COVID-19 is transmitted only by coughs and sneezes and that source control with a specialized Cough Mask completely interrupts COVID-19 transmission. COVID-19 had already been eliminated in every city the Cough Mask had been rolled out in. Now it was a real-life game of survival until the Mask arrived in New York City. Until then, quarantines were the last effective shield against a raging, deadly pandemic.

Extreme pain and human suffering reigned throughout the city. The vast majority of COVID-19 deaths occurred at home, making those losses even more personal and painful to bear. Citizens were asked to carry their own dead outside for pick-ups. As if that were not enough, utilities and services were deeply slashed, and food was extremely scarce. Sadly, the tired man on the bus had a long string of relatives, friends, and neighbors die from COVID-19. Being a good man he was supported and helped out whenever possible, including carrying bodies outside. Four to five people carried the bodies overhead and negotiated the sheet wrapped bodies around corners in the house. The scene was reminiscent of inexperienced friends helping friends move. The bodies were left at the end of the driveway. Friends and family prayed for the body from the top of the driveway. Then they went inside, and the body was pick-up in the morning, not vastly different from garbage pick-up. It was painful to watch.

The night before our bus ride, from a bird's eye view, I saw several hoodlums breaking quarantine under cover of night. They split up and roamed a neighborhood in search of buildings to loot for food and supplies. One of these tried for hours to break into the tired man's first floor apartment. I had a ceiling view from inside his living room. With tears in his eyes the man intensely cried out and pleaded with the looter "I know you're hungry! But so are we! And we have small children! Please! Please! Just go away! Find somewhere else to break in!" It was breaking dad's heart for his family to go through this on top of all they had been through already. I could literally feel his pain and it broke my heart too and it brought tears to my eyes as I watched. The frightened little children huddled under a blanket and held tightly to mom on the living room floor as they watched dad frantically reinforce the patio entrance. When I wondered why they did not hide in the bedroom, it was revealed they had to be ready to run out the front door to a neighbor's house if the looter was able to break in. Hours later, the looter finally left, and dad allowed mom and the children to sleep while he stood watch . . . even though the next day was going to be his first day back to work . . . in many months.

Now, back on the bus and in my seat, I clearly understood why he was so tired . . . he had been through so much during the past approximately 6 months. Even though he was normally a strong, well-adapted, and resilient young man, he was actually now on the brink of a nervous breakdown.

Since prior to Mar. 21, 2020, I had never seen a city wide quarantine, I started wondering more about what such a quarantine would look like and Immediately I got a bird's eye view over the city as it was the previous Thursday during the day. Very few government offices and very few businesses remained open. As I surveyed from up high over a suburban neighborhood, I noticed I was effortlessly able to make zero degree radius turns without slowing down (I believe this normally impossible performance caught my eye only because I previously worked with flight mechanics.) The eerily empty streets below seemed abandoned, and the only noticeable movement was random bits of trash blowing in the wind. I only saw one vehicle, an older, large, white four door sedan; It passed by slowly on the avenue bordering the neighborhood.

Later, I stopped (on a dime) and backed up as I noticed a woman behind me hiding and peeking nervously from around the corner of a building. She dashed to the next building and repeated. When I wondered what she was doing, I got a bird's eye view from inside of her apartment just moments earlier packing supplies and when I wondered where she was going with them, I got a bird's eye view of a grateful, needy, elderly relative receiving them a while later. The consequences of breaking quarantine were stiff, but the situation was dire and luckily this time, the nervous woman made it back home safely and no one got infected.

I was suddenly back on the bus, and I wondered how the city could have completely opened up so thoroughly . . . literally overnight? I was shown that today the Cough Mask replaced all other public COVID-19 measures including facemasks, social distancing, business closures, quarantines, and vaccines.

Starting today, the only public COVID-19 measure was Source Control of every cough and sneeze with the Cough Mask. To this end, no one could leave home or enter the city without a Cough Mask. As I looked around, almost everyone in the city just carried their Mask on a belt holder. It looked like an extremely easy, simple solution. It was reminiscent of people just carrying a handkerchief in their back pocket. Occasionally, a random person used their Cough Mask to cover a cough, put it back on the belt holder, and went about their normal business. Not a single person in the city complained of the mask. Everyone wanted the Mask; it was their salvation; Compliance was literally 100%. Use of the Mask at home was optional. Those who were not physically able to use the Mask such as preschoolers, the feebly old, and the severely ill used the Mask as best they could and remained quarantined until all quarantined COVID-19 cases burnt out and the city was officially declared COVID-19 free. "How long will that take?" "Usually, 1 to 3 months. On rare occasions up to 6 months." After the COVID-19 free declaration, everyone gladly continued to use the Cough Mask as assurance COVID-19 would never, ever, return.

He was right again: According to the CDC and WHO, COVID-19 infections require a large viral load. Source Control, with a specialized tool, easily leaves nowhere near this required large viral load. Furthermore, source control is unaffected by mutations. Along with universal compliance, infections in all public areas suddenly become a rare, one-in-a-million, event beginning on hour one of day one.

As the bus moved through the street, I walked up to the front of the bus to get a better view of the city streets. Some buildings had been badly burnt and damaged. As I wondered why, I was informed there had been riots. The streets had a blackish moldy film like they had not been used and/or cleaned in many months. Obviously, the pandemic had become a cataclysmic catastrophe.

When I wondered why the traffic was not super heavy today, it was revealed only 40 to 60% of businesses were ready to open on the first day. More would open soon, but some 10% to 20% would take months to reopen. About 5% of businesses were considered of "higher infection risk" and were asked to wait until the city was declared "COVID-19 free" to reopen.

To our left, we passed a public service announcement written on a large billboard, STOP COUGH AEROSOLS STOP COVID-19 intended to remind everyone to cough into their Cough Mask. He was right again. Logically, public service reminders may be needed to get an entire population to start a new habit of source control, or respiratory etiquette, with the Cough Mask.

"When is this?" I received a vague, non-specific answer of six months to three years into the future; Apparently, He knew, but He could not tell me. (My best guess it will either be the 2021-22 or 2022-23 COVID season, based on my observations that COVID-19 was raging much worse than during the 2020-2021 COVID-19 season and that it was cloudy, cool, and sprinkling outside, and that we will lose our Cough Mask choice around Sep. 21, 2023.)

"So, will New York be the first city to get the Mask?" He graciously answered, "Look and see." I was shown a Map of the United States. Red dots sequentially lit up on the map to depict the chronological order of major metropolitan areas that had received the Mask. Mask deliveries started in the Pacific Northwest (Seattle/Tacoma/Bellevue) and continued South along the West Coast, then continued Eastward along the Southern U.S. border, then up the eastern coast, and then back Westward through the Great Lakes region and beyond. He was right again. Studying later revealed this route would take a large ground based fit-and-delivery van fleet past most Americans in the least number of miles driven. https://en.wikipedia.org/wiki/File:CBS_A_WallMap_Sep2018.pdf I was shown that all masks coming out of every assembly line in the country were shipped to only one city at a time. When that city was fully supplied, all masks were shipped to the next city in line, and so on. He is right again. This strategy recognizes that the efficiency of Source Control rapidly (exponentially) approaches 100% as participation approaches 100% . . . it would actually save far fewer lives to ship masks to all cities at once.

I was shown the size of the fit/delivery team was large enough to avoid bottlenecks. He was right again; an efficient Cough Mask roll out should be limited by one factor only: The (maximum) production rate of the Mask.

"How do so many Masks get manufactured?" Again I was shown a map of the US. There were three Mask factories located in the north central part of the country. He was right again. Months later, I stumbled on the fact that 3M has a mask manufacturing plant in that part of the country. The Mask I was shown had similar construction and design features as 3M's half-mask respirator; Further considering that 3M is the best mask manufacturing company in the world and has a worldwide reach makes 3M the logical choice to manufacture the Cough Mask.

I thought these Masks could be made cheaper and quicker in China, so I asked, "Why not China?" The rationale I received was to avoid delivery interruptions by foreign individuals or nation(s). He accurately predicted the future. We have already seen COVID-19 supply line interruptions coming from other countries.

"How do so many masks get delivered?" He said, "Look and see." From a bird's eye view, I could see an army of small, white, tall, and narrow industrial vans snaking through neighborhoods delivering Mask's door to door. They used a centralized GPS navigation system to ensure no one was missed or duplicated. Down below me, I watched one van park on the street in front of a house and the driver and a co-worker got out carrying some Masks. I zoomed in to ground level. The driver walked up to the house and the co-worker walked up to the house to the right. The driver knocked on the front door and asked everyone (a family of seven) to step outside for a Mask fitting. I wondered why outside, and it was revealed it would reduce the chance of COVID-19 infection during fit and delivery. While keeping his distance, the man visually chose the correct size Mask, delivered it, and visually confirmed the fit. Again, He predicted the future. On Mar. 21, 2020, I was unaware of social distancing as being a thing nor of the strategy of choosing outdoors to reduce COVID-19 infections. One child's Mask did not fit well, and it was quickly exchanged for the proper size. Another child's fit was more difficult, and he followed the driver out to the van for a "special shaped" Mask that fit better. After fit and delivery, the driver walked to the house on the left and repeated the process.

He was right again, in a surprising way. Months later, my brother informed me his work required him to have his work respirator mask custom fitted. As I only found out subsequently, professional custom fitting of air tight masks is actually an OSHA requirement. So, if say New York city requires the air tight Cough Mask to be used in the workplace, then the OSHA custom fit requirements would apply. I had no clue about this in March 2020 because air tight masks are not required in dental offices.

Again, He was right. During an almost "total quarantine" door-to-door fit, and delivery makes a whole lot of sense because everyone is already at home, and it would avoid the chances of them getting infected on the way to pick up a Mask elsewhere.

The last Mask in New York City had been delivered that Saturday morning and the team prepared to move on to the next city. The city publicly confirmed that Monday would be the first day of the Cough Mask policy. He was right again. The exact date when deliveries will be completed is difficult to predict. Therefore, setting a tentative start date gives everyone a chance to make tentative arrangements to open up businesses and return to work. With everyone basically ready, the start day can then be set the next business day after deliveries are completed. Considering that New York City gets a lot of visitors, I asked:

"Will tourists get a mask?" From a higher bird's eye view over the city I saw a Mask Check stop, out in the country, on all roads leading into the city. He was right again, if major metropolitan zones are extended to include the countryside, fewer, less busy roads will need to be checked for Mask compliance. The National Guard helped local and state police. Again, He predicted the future. The National Guard has already been called to help out with COVID-19.

This would have never occurred to me on Mar. 21, 2020. I moved in, for a closer inspection, at a stop south of the metropolitan area.

Travelers that had a Cough Mask and that could demonstrate correct usage of it, were allowed into the city. Those without Masks were questioned. A woman with small children in a crossover vehicle was stopped and asked, "what is the purpose of your visit?" She said, "I'm visiting my sister on Long Island." The National Guard replied "This is no time for social visits. Go home and come back when this is all over." The woman obediently turned around and drove all the way back to West Virginia. Then a man in a four door luxury sedan dressed in a suit was stopped. When asked, he mentioned he had a meeting at the Governor's office. He was given a Mask, shown how to use it, and allowed into the city. I was suddenly back in my seat on the bus.

He was right again. To ensure 100% usage, the issue of visitors would need to be addressed . . . and He did so quite well. This was far removed from my reality on Mar. 21, 2020.

Now that I had been brought up to speed as to what was currently going on in the city, I was informed it was time for a live demonstration of the Mask preventing COVID-19. Recall there were no other COVID-19 measures on the bus (or anywhere in the city). Sincerely alarmed, I counseled my friend, who was currently not of this world, "You can't do that in a crowded bus like this, someone might get infected." He assuringly replied, "No one is getting infected." "OK, so no one is getting infected now, but how about later (today)?" Again, He assuringly said "No one got infected on this bus today." Part of me felt it was odd to hear that in the past tense, but another part of me knew time was actually different from what we have been brought up to believe. Then He gracefully gestured towards the next bus stop and cordially said "Look to your right." As I looked, I noticed the bus was pulling over to pick up someone waiting at the bus stop.

"The person getting on the bus has COVID-19." On Mar. 21, 2020, I knew COVID-19 as the Coronavirus, so I raised up my hand and said "Wait a minute, I'm getting lost. Are we changing subjects? Is this a new disease?" As I spoke, time literally "paused" around us, probably so I would not miss anything. "No, it's the same disease. Covid-19 is just the official name, more commonly used in the future." He predicted the future correctly. We are using COVID-19 more commonly now than we were on Mar. 21, 2020. Furthermore, researching later I discovered the World Health Organization (WHO) had, in fact, "officially" chosen this name on Feb. 11, 2020. "Oh, I understand, Keep going." Time resumed.

I noticed the man getting on the bus looked about 70 years old and was visibly ill. I was sincerely alarmed and again warned, "You can't allow someone, that sick, with the Coronavirus to enter this crowded bus." I sincerely believed no mask in the world could be that good and I did not want to risk anyone getting sick for my sake. Excited to unveil something wonderful, He paid no mind and enthusiastically said "Watch this."

As the man entered the bus I wondered "What is this man doing roaming the city while he is sick with Covid-19, in the first place?" Immediately, I got a bird's eye view over the bus. I then zoomed out until his house across town came into view, and then I zoomed back in, into his upscale, older, suburban neighborhood and further zoomed into the living room of his home, as it was earlier that day. His house was very clean, and he had very nice, but outdated, furniture. I saw him calling his doctor (on a landline lol) concerning his moderately worsening COVID-19 symptoms and his doctor asked him to come to his office because they were opening today. At this time in the future, the Cough Mask had proven itself so reliable and effective that even symptomatic COVID-19 patients did not have to quarantine. The law merely required him to be well enough to use Cough Mask correctly. That level of mask performance was unheard of to me. Also in the future, it was established that normal talking and breathing did not cause COVID-19 infections . . . even by moderately ill COVID-19 patients in crowded, stagnant buses; Only coughs, sneezes, and to a much lesser degree, fomites, caused COVID-19 infections. (Again, this scenario is in perfect agreement with Dr. Mayya's assessment that even moderately ill COVID-19 patients do not cause infections with their normal breathing and speech.) All eyes in the bus were on the noticeably sick man. As soon as he started walking up the bus steps, he felt an urge to cough. As he grabbed his mask, the bus maneuvered abruptly around.

an illegally parked vehicle in the right lane. As a result, the ill man lost his balance, and was momentarily unable to use the Cough Mask. Those in the front of the bus immediately held their breaths until they deployed their masks as emergency face masks. Those in the back of the bus just put their hands on their Masks but kept it in the belt holder and waited to see what would transpire; They knew a cough aerosol would take a while to reach them. Those in the middle of the bus deployed their masks and held them near their face, at the ready. Fortunately for everyone, the man was able to hold his cough long enough to use the Cough Mask properly. Everyone immediately relaxed and casually returned their Masks to their holsters.

The sick man then removed a disinfectant wipe from a small disinfectant wipe dispenser supported on another belt holder; This measure struck me as excessively nerdy, and I was critical of the notion. He was right again. Through later testing, I discovered that a wipe dispenser on a belt holder makes holding a Cough Mask in one hand . . . and dispensing and disinfecting with the other hand . . . much easier! The man first wiped the parts of his face that were under his Mask when he coughed. He then folded the wipe once, wiped the inside of his Mask, and returned the mask to its belt carrier. He then folded the wipe a second time, wiped his hands, and then disposed of the wipe. To me, this seemed a little excessive and bordering on neurotic. He was exactly right again. Months later, while testing, I realized the face and the inside of the mask do become contaminated and that wiping, including his hands, reduces the chance of a fomite infection.

As the sick man wiped underneath the seal edges, I noticed the Mask's rubber seal edges folded inwards. This design feature struck me as unnecessarily complicated and hard to clean. I complained of this and was shown several alternate seal designs. He was right again in a surprising and very technical way. Months later, through pressure testing, I found this type of seal design formed an amazing positive pressure seal . . . exactly what a Cough Mask needs! (Here a positive pressure is defined as higher pressure inside the mask, than outside.) Further aerodynamic/fluid dynamic analysis revealed why this might be. I noticed a scuba diving mask's rubber seal edges point outwards, making it a great negative pressure mask. The Cough Mask was the exact opposite design: the rubber seal edges point inward, making it a great positive pressure mask.

He was correct in another amazing technical way. In an unforeseeable, fortuitous turn of events, I asked my patent attorney to find out how much it would cost to lease out from 3M the seal design I was shown. He later reported back there would be no cost on account the patent covering this type of seal had expired! As the person in front of me returned his Mask to the belt carrier, I noticed the belt carrier had a lid that completely covered the Mask when it was docked. This design feature struck me as unnecessarily complicated. He was right again. Also through later testing, I realized this design feature would help to prevent accidental fomite infections. Furthermore, it helps to stabilize the Mask while in the holster.

As the man seated directly in front of me deployed his Mask, I noticed the Mask was positioned upright on the belt holder, and he thus had to turn his wrist to grab it. This seemed like the wrong way to orientate the Mask. I started out telling my designer I wanted the top of the Mask pointing forward to avoid twisting the wrist. He was right again. Testing months later revealed this orientation allows the arch of the Mask to match the arch of the hip and therefore allows the Mask to seat flusher against the hip, thereby staying "out of the way all day."

No one kept their distance from the sick man; In fact, he had to literally elbow his way into the standing area, afterwards he remained standing shoulder to shoulder with them. This was after all New York City, but I was amazed at their confidence in the Source Control with the Cough Mask Method.

Then I asked Him "What would have happened if he hadn't used his Mask in time?" He enthusiastically said, "Look and see." Immediately this alternate scenario unfolded for me to witness: Again, I felt like I was actually there. This time the sick man was not able to cover his sneeze. Those standing and sitting nearby immediately stopped breathing until their Mask was properly held in place like an emergency breathing mask; Those further back did the same, but without holding their breath. I was expecting the bus driver to pull over in the middle of the street on an emergency basis and let everyone out; instead, he calmly drove a few blocks to the next bus stop and made a normal stop and then let everyone out. Nobody on the bus freaked out. I was further amazed at how effective the Mask performed as an emergency face mask. He was right again. The filter should be able to catch aerosols in either direction. Furthermore, by providing a perfect seal, contaminated air does not sneak in around the edges like a regular face mask.

Everyone disembarked the bus and waited at the corner bus stop. It surprised me that once outside, everyone returned their masks to their belt holster. It further surprised me that the ill man was allowed to wait close to them (a couple of feet away.) He was right, the unprotected cough occurred indoors, plus current evidence shows infections are more rare outdoors; A few passengers disinfected their hands with wipes, mostly those who had touched surfaces like the handrails during disembarkment. He is right again. This agrees with CDC data that if unprotected cough aerosols land on objects, fomite infections are slightly possible. Soon, a replacement bus was dropped off by a team of two, everyone boarded the new bus (including the sick man!) and the commute continued. The incident was written off as an accident caused by the illegally parked car; The sick man had demonstrated proper use of the mask as required by law.

The bus was first decontaminated, then driven back to the station. I was impressed with how seriously they took a single unprotected cough. Again He is right. A single cough can kill a person; Is it not worth everyone nearby covering up with a tight sealed (emergency) mask, wiping hands that had touched nearby surfaces, and changing buses? We are nowhere near being that sophisticated and paying that much attention to uncovered or inadequately covered coughs. No wonder we have so many infections! Instead we are distracted by "safely" assuming breathing causes infection which leads us to full-time face masks, which turn out to be insufficient, so we have to add vaccines, quarantines . . . .

The unprotected cough demonstration was now over, and I was still on the bus.

Back in normal time (the protected cough time,) I asked "Exactly, how effective is the Mask?" At the front of the bus, a holographic chart appeared showing the number of new daily COVID-19 cases in New York City versus days (Curiously, the days increased from right to left, not sure why.) The number of daily cases had been very high and holding steady. On Day One of the Covid cough mask strategy, new infections dramatically plummeted by more than 95% (from one day to the next!) (Again, it struck part of me a little odd because the day was not over, yet we knew the final tally.) Wanting to know everything about the mask I said "Ah ha. So the Mask is not 100% effective, why is that?") He kindly responded, "There was (only) one new infection in the city (public areas) today; The rest occurred in quarantine, by those who couldn't use the Mask properly." Still wanting to understand the mask better, I asked "Why did that one infection occur?" From a bird's eye view above a bus stop across town, I saw a sick man cough with his mask accidentally lifted off the right side of his face; a man who approached him from his left side was unaware of the mishap; He came around and waited for the bus on the sick man's right side and breathed his leaked cough aerosol. Curiously, I think this was the same sick man on our bus earlier on his way back home from the doctor. It was cold and rainy and as the long day wore on, he became weaker and sicker. This infection was therefore not a Cough Mask failure; The Cough Mask was actually 100% effective, on day one! I was now back on the bus.

It was hard for me to believe the simple mask I was shown earlier could possibly be 100% effective and I thought maybe now, in the future, they had more sophisticated Masks, so I pointed to the sick man's mask and said, "Let me see that Mask." Suddenly time froze (again.) The mask floated from the sick man's hand to me in a squirrely up and down, stop and go, path. He was right again. Months later I tested by filming myself walking, with a mask in my hand, while swinging my arms normally. The mask took the exact same squirrely path, meaning He had walked the Mask to me with mask in hand, but I simply could not see Him.

The Mask slowly rotated, and I closely inspected it from all angles. I was struck (again) by how simple it was. The Mask was roughly shaped like a rectangular prism with rounded corners, slightly wider than tall. He was right again. Months later, after careful engineering analysis, I realized a cough mask mainly consists of a high flow rate filter and a good pressure seal . . . very simple.

I thought it was odd, and maybe a shortcoming, that the Mask did not cover most of the nose. He was right again. Months later, as I practiced coughing into a 3M half mask, I realized my eye-glasses got in the way when placing the mask against my face. After designing as shown, I found a shorter nose piece does not get in the way of eyeglasses or sunglasses . . . very important! Just like this, I did not appreciate most of the Mask's design features until months later.

The front of the mask had a coarse grill with only four to six pillars. Why not a better, finer looking grill, I thought (and criticized)? He was right again. After closer analysis months later, I realized fewer pillars block less flow . . . a plus for a high flow rate mask Cough Mask.

Since it was the same simple Mask, I was sure there must be a futuristic filter inside, so I asked, "What's in that thing!?" He spread his hands apart, palms up, in a gesture of openness and said, "Look and see." Suddenly, I was in a dark room. A single light hanging from the ceiling clearly illuminated the Mask laying on a small square table below me. (I was curious where I was, so I tried to look around the room, but it was too dark. I thought I may have momentarily glimpsed a short hall leading to an open doorway.) Invisible hands pressed on the front grill and pushed the filter holder out the back of the Mask. I had never seen a mask filter come out the back and it seemed very odd. I asked why, and it was shown to me that a strong cough would tend to separate the filter holder/Mask seal and tend to shoot the filter holder out the front. He was right again. Analyzing later, it occurred to me that I had never seen a mask filter come out the back simply because I had never seen a Cough Mask; Furthermore, this design feature made perfect sense.

I also questioned the possibility of air leaking between the filter holder and the mask. I was told it would not be a problem, but that if it worried me, I could add a rubber gasket between the two parts. He was right again. I asked an engineer about this concern, and He assured me that manufacturing tolerances had grown small enough that this should not be a concern. We discussed the use of a gasket and he said that would work too. Invisible hands opened the filter holder like a book and revealed a simple, coarse filter. I had never seen a filter holder open in two equal pieces.

He was right again. Only after testing months later did I realize that when you open such a filter holder, the fibrous fiber media stays stuck in one of the two halves, which makes it very easy to grab and pull out. We initially designed it with a sliding door. As it turns out, I am having trouble pulling the filter media out of the filter holder. Sometimes I pinch the filter media so hard that I actually tear it. The design process played out like this many times where I initially designed it "a better way," realized it would not work, and then reverted back to the original way it was shown to me, and that did work.

He was right again. A replaceable filter holder means only the filter media has to be replaced, thereby saving money. This will be very significant when billions of Masks are built . . . on an ongoing basis.

Thinking there must be a high tech filter sandwiched inside an outer fibrous pre-filter, I asked "What kind of filter is that?"

"An aerosol filter." He calmly explained. Again, this made me very nervous because I had always heard, if you want to catch a virus you need a super fine filter like a HEPA filter. I lost it and exclaimed: "You can't do that! You cannot catch viruses with a porous filter like that! Viruses are too small! They will go right through that thing!" (It is kind of hard to explain, but I mainly viewed him as an old friend that was not from this world. Only later did He fully present himself as Jesus/God.)

He is right again. Months later I priced fibrous filter media and found it to be incredibly inexpensive and that this savings is significant when multiplied by Billions of Masks needed. But patiently and kindly, He said, "You don't have to. The viruses are stuck to an aerosol. If you catch the aerosol, you catch the virus." He was right again. In March 2020, I had never heard of the concept of catching a virus by catching the aerosol it is stuck in. That is a genius idea! A coarse aerosol filter is the perfect high flow rate filter for coughs. (Again, the recent article from Dr. Mayya et. al. concludes only aerosols greater than 20 microns before desiccation carry significant amounts of SARS-CoV-2 virus, therefore a coarse aerosol filter like the one shown will perform nicely. https://rdcu.be/cj7os) It was hard for me to believe all the viruses were stuck to the aerosols. I had just never really looked into subjects like that prior to my NDE.

"Come on, are you telling me all of the viruses are stuck to the aerosol?" He calmly replied (He never once took issue with my fears, arguments, or protests). "You are right . . . Especially with extra hard coughs and sneezes, a few viruses do break loose from the aerosol . . . but not enough to cause infection." He showed me a wind-tunnel-like airflow visualization showing just a few viruses breaking loose from individual aerosol particles. Noticing I still was not totally sure of that new strategy, (He could read my mind, lol) He said, "You can add a HEPA filter behind the aerosol filter . . . but you don't have to." Meaning "Don't give up on the Cough Mask; I would rather you use a HEPA filter, if that's what you need to feel better about the Cough Mask idea." He was right again. In engineering school, I learned every design is a compromise or balance of many factors, meaning you should not use a HEPA filter unless you have to.

"How is the filter maintained?" He gave me a vision of a symptomatic man rinsing his Mask during his office lunch break. He removed the filter media and simply rinsed it, the filter holder, and the Mask under the sink. Most people waited till they got home to rinse it; Obviously, if you did not cough that day, it did not need to be rinsed that night. He is right again, a washable filter media is less expensive, easier, and better suited for long term use. Plus it is better for the environment.

He was right again. I found out months later, from an engineering professor with a special interest in air filtration, that only a low MERV, non-pleated form factor (and non-electric) filter media, exactly as I was shown, is washable. (He said rinsing would immediately damage any higher MERV, pleated filter media and would further remove any electrostatic charge.)

He was right again. Being able to easily remove and rinse the filter media separately makes it easier to rinse everything thoroughly.

Then, I asked how long does the filter last?

"Six to twelve months, depending on use." He is right again. Only having to replace the filter media once or twice a year will save both time and money. This is especially important when considering billions of Cough Masks will be here to stay for the foreseeable future.

I was back in my bus seat. Things seemed like they were winding down, so I took a moment to observe the general mood of the bus passengers and what I observed surprised me.

There was great happiness in the bus, but also great sadness. This confused me, so I asked "Why?" "They are very happy the mask has arrived, but grieve for those who haven't received the Mask, especially the poorest countries who will be hit the hardest and be the last to get the Mask." He showed me a bird's eye view of a world map with red dots representing cities with the Mask: Wealthy countries like the USA, Canada, Western Europe had the best coverage (about 30 to 50%). Middle wealth countries like some in South America, and Eastern Europe had moderate (about 15%) Mask distribution. Poor countries in areas like some areas in Africa had very little (about 1%) Mask distribution and were defenseless against a cruel, vicious pandemic. He predicted the future. A similar distribution pattern has already developed with the COVID-19 vaccination program. Right then and there I made another solemn vow: Not to profit from this evil pandemic. All Cough Mask profits, and patent royalties will be used to help eradicate COVID-19 from poor countries. 14 months later, I am even more committed to my mission statement than ever. By the way, the Mask is made from readily available materials using common manufacturing techniques therefore, the Mask can be easily manufactured by countries all over the world.

A world-wide Cough Mask manufacturing and distribution campaign can be completed several times quicker than a world-wide vaccination program;

My original question had now been thoroughly answered: In addition to knowing how to design the best possible Cough Mask, I now knew the best strategy, supply chain logistics, and even the best government planning and management needed to stop COVID-19 in the shortest amount of time. I was back in my seat, the bus was still rolling, but I sensed my visit was not over. For a second, I actually thought I was going to get a little bonus bus tour of New York City (lol.) Little did I know what was to follow . . . .

Jesus appeared standing at the front of the bus directly facing me. (It is rather difficult to explain, but I was never able to see Him directly and clearly. Now and then I could "see" His facial expressions or that he was pointing here or there, but these were like filtered representations of him). In front of him appeared a several inch thick, white, vertical arrow that arose from the floor of the bus to about waist high, then split in two, and curved to the left and right. Each arrow head pointed to one of two levitating, energetic, pulsating, glowing, multilayered, spheres, each about 3 feet in diameter. They looked "alive". For a moment it was as if He morphed from being my old friend from out of this world to being Jesus/my God and He spoke with strong, unquestionable authority:

"THE WORLD HAS A CHOICE TO MAKE . . . IF THE WORLD CHOOSES THE MASK . . . THIS WILL BE THE FUTURE." As He said "this," He gestured to the sphere to his right.

The sphere was the darndest, most unusual, thing you could ever imagine. As best as I can describe it, it was our actual living world, but layered into different times, like an onion. The top layer was our present earth. As I looked into it, I was drawn into it like a "tractor beam." I floated down the bus aisle in a corkscrew pattern and entered the sphere from an orbiting satellite perspective. I was able to travel around the earth and get a very rapid survey of what was presently happening, anywhere on earth. I am not talking about just satellite images or videos; Somehow my mind was able to upload massive amounts of current information on earth. If anything caught my eye, I could zoom in for a closer look. At will, I could get a bird's eye view or even a ground level view, in real time, of a single town, neighborhood, house or even a single person.

The inner layers were also actually our earth, but at different times into the future. The deeper the layer, the farther into the future. I was able to fly free as a bird in, out, and around, anywhere on earth, at any time during the next few years. I could even select a single location on earth and see how time affected it; I could "play" that single location "forwards" or "backwards" in time, by diving in and out.

Generally, I saw great pain and suffering all around the world. I could feel what people felt and it touched my heart deeply and I teared up. At first things progressed from worse to worse but then, to my great relief, things got better; After some rebuilding, the world was even happier than pre-covid. Sadly, as bad as the pandemic was during the 2020/21 COVID season, we have not seen anything yet). Still dazed from the sphere, I was both saddened by the hard times ahead and amazed by the new world to come. The new world seemed impossible for me to process, and I didn't want to keep trying in vain and squander my precious time with Him, so I returned to what I could understand and asked, "Ok, so we deliver a mask to every person in the world. After we get rid of the coronavirus, what do we do with all those masks?"

"Once the Mask arrives on earth, it is here to stay." Confused, I asked "Why is that?" "Y'all will want to keep the Mask to keep the coronavirus away . . . and, as y'all will discover, it will (inadvertently) keep the cold and flu away, and (inadvertently) help with other respiratory diseases . . . ."

Again, He seriously predicted the future here. (I have proof I emailed this specific information as early as Jun. 26, 2020) The totally unexpected partial disappearance of the flu during the 2020/21 flu season took the entire world by surprise, including the world's top epidemiologist.

The fact that He predicted that "getting by" with the flu is the wrong approach and that the right approach would get rid of the flu, and that eventually the right approach would (inadvertently) keep the flu away is strong collaborative evidence that my experience was real. Furthermore, it leads credence to the idea that the Mask will perform as "advertised." No doubt social distancing and quarantines played some role, but the biggest factor was source control: Basically, face masks are not specifically designed for (cough aerosol) source control and therefore provide very weak source control. In spite of this fact, it turns out that transmission is so susceptible to source control, that the weak source control provided by face masks is sufficient to stop the less infectious flu. This susceptibility is due to the fact that large viral loads are required to initiate invasive infection and it does not take much source control to reduce the viral load below this critical level. COVID-19 is more infectious than the flu, so to stop COVID-19 we need to substitute the face mask for the, specifically designed for source control, Cough Mask.

" . . . And it will also keep away a wave of new coronavirus pandemics." New coronaviruses totally shocked me, and I wanted to make sure I heard Him right. I asked, "There is going to be more coronavirus pandemics?" He replied "Yes, COVID-19 is just one in a wave of coronavirus pandemics." He was right in a big way. Later news articles revealed epidemiologists estimate there are perhaps 10,000 to 15,000 coronaviruses living among China's bat population. Some of which are close to jumping to humans. https://www.biorxiv.org/content/10.1101/ 2020.03.30.015008v1

One epidemiologist said, "It's not a matter of if we will have another coronavirus pandemic, but a matter of when." Another epidemiologist said, "COVID-19 is not a 100 year event, the next one could come tomorrow." https://www.n-pr.org/sections/goatsandsoda/2021/03/19/979314118/next-pandemic-scientists-fea r-another-coronavirus-could-jump-from-animals-to-hum I thought it was a coincidence to all of the sudden have a wave of coronavirus pandemics, so I asked, "Why a wave?" And he said, "That's just what's going to happen" Again He was holding back information. I was still very curious, so I paused to think of a different angle, "Where will they come from?" Again, I was shown a world map. A half dozen white arrows originated from a circular geographical region in southern China. The exact origin of each individual arrow seemed random. These white arrows arched over the globe in a direct path, similar to depictions of non-stop international airline flight paths, and ending up over the central region of the United States. (None landed near the East or West coasts or near the Northern and Southern borders.) I did not notice the names of Chinese cities on this world map, but I did notice the shapes of the map and the locations shown relative to those shapes. Later I correlated that geometry with google maps and determined all the new coronavirus pandemics will be coming from an about three hundred mile diameter circular area south of Wuhan, China and encompassing most of the Jiangxi province and some of the surrounding provinces of Hunan, Fujian, and Hubei. Then I asked, "Where did COVID-19 come from?" A White dot appeared on the northern border of the same region in china. With the same map analysis, I determined Covid-19 came from the Wuhan area or just south east of it. I felt it was odd all the arrows ended in the United States and in no other country, so I asked, "Are these coronaviruses being targeted towards the United States?" He said, "Y'all will find the answer to that question on y'all's own." Again, He was holding back. I sensed I hit near the end of the road in this line of questioning, so I paused to think and switched to: "How effective will the Mask be against the new pandemics?" Again on a world map, with red dots he showed locations of single case infections. A few cases developed in China, Europe, U.S., and a few other countries had one infection each. China had two or three times more cases than any other country. He said "If the world chooses the Mask there will be just enough infections for y'all to be able to recognize and document a new coronavirus has arrived on earth. I asked, "Will there be any deaths?" He showed me graphics indicating there would be only a few deaths in the entire world per pandemic. Most deaths occurred in China and near bordering countries. Then he summarized our first option:

"As you can see, If the world chooses the Mask, there will be some hard times ahead, but y'all will make it through to the other side. (A reference to child birth.) There will be some rebuilding and grieving but then things will be better (than before the coronavirus). There will still be a few challenges ahead . . . but afterwards, things will get even better!" I mistakenly thought the "few challenges" again referred to rebuilding. He sounded excited when He said, "even better," so I asked, "Explain even better?" He talked about the spiritual birth of a new humanity. Unfortunately, the concepts were far too advanced for me to comprehend. I did not understand a word.

Furthermore, and unfortunately, this and the initial greeting are the two times I cannot remember exactly what He said. I do not know how this "birth" is to happen, but I will give you my best educated guess:

Figuratively speaking, our deeply troubled world is feeling the birthing pains of a complicated, premature birth and it is not assured the fetus will survive the birthing process. The only way to survive our world war against COVID-19 is through the protection of each-other; This is what the Mask is designed to do. We cannot survive through self-protection; This is what masks, social distancing, quarantines, and vaccines are designed to do. If the world puts all its differences aside and comes together to fight this common enemy, and protect each other with the Mask, we will be victorious. Naturally, humanity will grow much closer together from the experience. But because we will continue using the Mask indefinitely, humanity will continue to move closer and closer together. When you carry and use the Mask instead of a face mask, you are really saying, "I love you" and "I trust you love me too." This love is received by those protected, magnified, and projected back out. This process is mathematically similar to a nuclear chain reaction. As this process intensifies, and billions of people participate daily, the day will soon come when a critical point is reached and suddenly humanities hearts will ignite on fire with love.

Mathematically, this is similar to when critical mass is reached within a dark Nebula and suddenly a star shines for the first time. When this happens our individual true human potential and spiritual powers will finally be revealed and, as a direct result of that, our society will be completely transformed . . . like a caterpillar turning into a butterfly. Will no longer be an economic based society, but a spiritual love based society.

My jaw literally dropped, and I was dumbfounded by the transformation our souls and our society were capable of and I was left speechless. The actual concepts were so incomprehensible, I could not even begin to formulate an intelligent question. To avoid wasting His time trying to understand the incomprehensible, I had to stick to my only reference point: "So is this it? If we make it through the pandemics, will we have a thousand years of peace and utopia like the bible says we will?" He lovingly smiled at me like a father smiles at a child sincerely trying to understand something he cannot understand and said "No, not just yet, first there will be a few more world challenges." Meaning yes, we are going to have something like "heaven on earth" soon.

Surprised to hear about more world challenges, I immediately became alarmed and asked, "What world challenges?" "Next, y'all will face a challenge coming from another country." "From where?" He briefly showed me a world map. Again, after comparing with google maps, I believe it will be mainly from an area around Moscow, with a couple other areas loosely aligned with it, but I am a little less sure about this because the map was shown so very briefly. Perhaps the large land mass was china? I followed up with: "What kind of challenge, like a world war?" He kindly let out a little "chuckle" like when an overly eager child is way off base, and He said assuringly, "Let us just get through this challenge first." Meaning, He will help us get through all the challenges. I understood this was the biggest challenge and we need to concentrate on it completely.

This was the end of His presentation of "Our future, if we choose the Mask" and I suddenly found myself back in the bus, in my seat.

Again He stood at the front of the bus facing me and spoke with strong unquestionable authority: "IF THE WORLD DOES NOT CHOOSE THE MASK . . . THIS WILL BE THE FUTURE."

This time He gestured to the sphere to His left. Again, I was immediately drawn to the left sphere. As I delved into this sphere, things started out the same as before, but continued getting worse without relief . . . I actually sobbed uncontrollably from the intensity and extent of pain and suffering I personally witnessed throughout the world. Please trust me, no one wants to, nor deserves to, go down this road. I kept pushing myself to go a little further because I wanted to know everything, even though the pain was unbearable. Finally, I cried out "Stop! Stop! I can't take this anymore!" Immediately, I was back in the original grayish cloud-like volume of space. I did not feel rushed as I caught my breath, dried my tears, and regained my composure. I was hoping the seminar was not over, so I asked. "I still want to know what happens, but can you just tell me what happens?" Suddenly, I was back in the bus again and He began to speak in a calm voice:

"I'll just point out the important junctures (without describing the horrific pain and suffering): If the world doesn't choose the Mask, as you saw things will initially worsen as before; However, this time things will continue to worsen till they get really bad, and things will not get better till the very end. The first vaccines will not work. The world will keep trying and later vaccines will not be enough to slow down COVID-19. COVID-19 will continue to grow causing the medical system to collapse. He is right again. Many experts agree that given COVID-19's capacity to grow exponentially and the relatively high percentage of patients needing hospitalization, hospitals could easily be overrun. Furthermore, with no medical treatment, Case Fatality Rate will increase several fold. https://www.texastribune.org/2021/01/07/texas-hospitals-coronvirus/

With no other defense, earth's last stand (a reference to Custer's last stand) will be extensive quarantines. He is right again in an amazing way: About a year later, I read the details of Custer's last stand and found the analogy ran much deeper than the obvious part that it was his last stand. Below are four of these analogies labeled 1)-4) If the world does not choose the Cough Mask, the world will be effectively arrogantly refusing a powerful new defensive tool against COVID-19. (It is more effective than all other COVID-19 measures put together.)

1) Custer arrogantly refused a powerful new defensive weapon against Native Americans, the Gatling Gun (It shot 400 rounds per minute at a time when most guns just shot 1 round per minute). https://en.wikipedia.org/wiki/Battle_of_the_Little_Bighorn https://www.popularmechanics.com/military/a22451/history-gatling-gun/

Quarantines will continue to devastate the world's financial system and finally the world will go bankrupt. The whole world declaring bankruptcy sounded odd, so I interrupted "Wait, the world will go bankrupt? Like all at once?" He showed me graphics depicting country after country declaring bankruptcy in quick succession (like dominos) due to monetary interdependence. He is right again. Quarantines have been absolutely devastating financially. https://jamanetwork.com/journals/jama/fullarticle/2771764

Due to inter monetary dependence, particularly between closest trading partners, one country declaring bankruptcy can easily start a domino effect.

Finally, with no budgets, governments will be forced closed and the world will fall into anarchy.

He is right again. Past experience has shown that when congress cannot agree on a budget, our government offices close. It will be much worse if congress's bank accounts are closed.

With no organized defense, the COVID-19 will rapidly mature to full strength . . . .

2) Reportedly, a lack of an organized defense helped Custer's men fall quickly. This is collaborated with widely scattered and randomly located graves. The men were reportedly buried where they were laid by the U.S.

When I wondered how anarchy allows COVID-19 to rapidly mature, He reminded me of a small, dry, dusty, windswept, bankrupt village I had seen in my tour of the world. Hunger drove a weak, thinning widow out in search of food for her small children. She entered a friends house, but he had no food. Not wanting to come home empty handed, she went under a bridge and got some creek water in a disposed plastic container she found. The only things she was able to bring home was some dirty water and COVID-19. Figuratively speaking, anarchy forced quarantined doors open and allowed the winds of COVID-19 to easily blow through her home, her village, and the world.

Sadly, from my previous tour, mom died from COVID-19, her children cried over her body, and were too small to remove her body, so the body stayed in the house to decay. Unattended, the small children died one by one, frightened, sad, and all alone in the world, of disease, hunger, and COVID-19. On a personal level, it was unimaginably sad, and sickening to witness, but very representative of the evil the COVID-19 pandemic is happy to deliver to billions of families around the globe. In terms of the sheer intensity and extent of human pain, suffering, and paralyzing fear enveloping humanity, Earth getting hit by a giant asteroid would be a blessing by comparison.

. . . and the world will finally see what it is truly facing, but it will be too late . . . " Again, I felt like He was holding back shocking news about what the SARS-CoV-2 virus really is.

3) General Custer confidently led the cavalry in pursuit of Native American tribes. But by the time he got to the top of the hill and actually saw the huge size of the American Native settlement, it was too late . . . past this juncture, 100% of Custer's men were destined to die no matter what they tried.

The world is currently confidently riding the vaccine in pursuit of COVID-19, by the time we reach the top of the hill and actually see what we are truly facing, it will be too late.

4) Custer was warned of the size of the Native American Village by a scout who had gone ahead and actually seen the settlement first hand. (Custer felt his description was not in accordance with his knowledge of Native American Settlements.)

" . . . At this critical juncture, the Mask choice will be lost." This critical juncture will occur in about three years." (About Mar. 21, 2023) Totally shocked, I asked "Why?" "Finances and organization are needed to manufacture and distribute the Mask worldwide."

He is right again. By comparison, a worldwide vaccination program is a daunting task under normal circumstances, but impossible in a bankrupt world in full blown anarchy.

We do not have the luxury to just "wait and see how it goes" because COVID-19 effectively works like a "humanity mouse trap." Then He elaborated:

"Past this critical juncture there is nothing anyone on earth can do to change the eventual result." I asked about this, and I understood the most anyone could ever do is slightly alter the timing or the sequence, but the final result will be the same. He is right. It would be wonderful to reduce deaths by choosing the Mask ASAP. But the most important thing is that we choose the Mask before this critical juncture.

"Soon afterwards, the new pandemics (COVID-23) will begin arriving on earth. At this juncture, earth's population will be about 90% of today's population." I was shocked by that number, but I sensed He was speaking the truth and I did not question it. "How soon afterwards?" He said, "About six months later." (i.e., by Sep. 21, 2023 780 million people will have died worldwide from COVID-19 and COVID-23 will arrive.)

He is right again. Mutations can do crazy things even with better behaved diseases like the flu. The flu pandemic of 1918 lasted two years. During the first year, 1917, the virus spread like wildfire throughout the world, but otherwise, it was just a regular flu. By the end of the summer of 1917, it seemed like the pandemic had ended and everyone relaxed. Sound familiar? During the next flu season, quite the opposite occurred; Mutations caused the Case Fatality Rate (CFR) to skyrocket to 10%. (That is a 10,000% or a 100 times increase from a 0.1 CFR, in just one season.) Mutations also allowed a huge spike in death rates among 25-35 year olds. See: https://www.cdc.gov/flu/pandemic-resources/reconstruction-1918-virus.html Or: https://www-.goodrx.com/blog/flu-vs-coronavirus-mortality-and-death-rates-by-year/

As a result 675,000 Americans died and 50 million died worldwide during one flu season. Because today's population has grown three times higher, on a per capita basis, those numbers today would be 2 million Americans and 150 million worldwide in one flu season. https://www.history-.com/news/spanish-flu-second-wave-resurgence "The third Pandemic (COVID-24) will arrive about a year later." i.e., COVID-24 will arrive about Sep. 21, 2024. "When will the others arrive?

On average, one will arrive about every two years." I asked, "How bad will they be compared to COVID-19?" "Each pandemic will be a different disease attacking the body in different ways. In terms of mortality, the second pandemic will be worse, the third milder, but on average they will all be about the same (as COVID-19)." Then He re-directed me. "The important thing is these pandemics will superimpose such that the total death rate will be higher than the sum of each individual death rate. He was right again. I found out later this is a real phenomenon. Last year epidemiologists announced they were worried the flu and COVID-19 might superimpose (synergistically) to produce "comorbidities" worse than the sum of each morbidity. This is especially true when each disease attacks the body in different ways . . . this is why he took it upon himself to point this out before answering my question.

"In about 12 years the world's population will be about 10% of what it is now. By this juncture, the pandemic's death rate will have slowed down." (By Mar. 21, 2032 there will be about 780 million people left on earth.) Slowing down did not make sense to me, I felt with more coronavirus pandemics, the death rate should be higher, so I asked "Why?"

"When a campfire has only 10% wood remaining, the flames dwindle and smolder." He was right again. His insight surprised me. Then He continued:

"The death rate will keep slowing until the pandemics finally end in about 20 years. At that juncture, the worlds population will be about one thousandth of one percent (0.0001%) of what it is today." (After the pandemics end on about Mar. 21, 2040, there will be about 10 thousand people left on earth.) I gasped that basically our civilization would be completely gone and asked, "Are you sure about that?" He replied assuringly, "Yes."

"What kind of life will these small number of survivors have (all alone in the world in a big city)? In fact no one lived in the cities. I was given a bird's eye view of a small, secluded community in a forest in mid-eastern United States. They shared possessions including a large, wooden community activity center in a clearing surrounded by deep woods, with walking trails leading to small individual homes. They lived very contentedly in harmony with each other and in harmony with nature with no modern conveniences or technology.

"How many people in each community?" "50 to 500."

"Will there be communities in other parts of the world?" I zoomed out to a satellite view and saw about a half dozen red dots representing small communities scattered about the United States and about a half dozen in Europe. I also saw a few dots in Canada, Central and South America. The rest of the world had fewer community density with the least density in the orient and in Africa.

"How far apart are the communities?" "The communities are about 500 to a thousand miles apart and have no communication between them; That's part of what helped them to survive." He is right again; no communication would partially help people to survive pandemics. Detecting a small window of opportunity to survive these pandemics I sheepishly asked, "What exactly did these people do to survive the pandemics? He said, "Nothing." Feeling a bit let down, I pressed, "How is it possible they did nothing and still survived?" He showed me a campfire deep in the woods and said: "If you let a campfire burn completely, let it cool till the next day, and carefully sift through the ashes . . . " (His invisible hands sifted through the ashes with a stick, found a tiny piece of wood, pointed it out with the stick, and repeated the process several times as he talked.) . . . " you will find tiny pieces of unburnt wood . . . these are the people that survive the pandemics; So you see, they didn't do anything special, it was purely a random chance. There is nothing anyone on earth can do to control who survives the pandemics." Meaning I cannot help myself, my loved ones, or my friends to survive . . . He knew exactly what I was thinking (LOL) Again he was right. To test if He was right, I allowed a campfire to burn completely. The next day I rolled the ashes with my fingertips, and I did find, randomly located, widely spaced, tiny pieces of charred, but otherwise unconsumed wood. This insight, that the mathematics of a pandemic are the same as the mathematics of a campfire, left me in awe of Him. Then He summarized our world's choice:

"So you see, the pandemics will end either way; As I just showed you, or with the Mask. The choice is up to the world to make." Again, he was right, the world has a huge decision to make. I have always heard God loves us so much he gives us free will. But I can assure you, He wants us to choose the Mask.

I felt that was the end of my COVID-19 seminar. However, I felt very inadequate to single handedly deal with this huge world problem and to initiate the world paradigm shift required to solve it, so I pleaded: "Wait, don't end it, tell me more, or let me think of more questions to ask."

But he assuringly said "You now know . . . everything you need to know." He was right again. He handed us the solution to COVID-19 on a silver platter. What more can we ask? It is now totally up to us to choose. I had zero control in this matter; Those were His last words.

Within a few seconds, I found myself seamlessly back in my body, on my back and in my bed. As I opened my eyes, half in shock, I asked myself "What the hell was all that???" . . . Do I dare tell anyone? Will everyone think I am crazy? It was a beautiful sunny spring day, and everything seemed just fine with the world, so I decided to keep this information to myself, and I tried to convince myself it was just a dream. I took my family on a spring break vacation as planned. However, unlike a dream, the whole experience was permanently imprinted into my brain. On the third day, I confided with my wife about some of the events on the bus. She was understanding. Eventually, I started researching the things I learned and to my surprise, I found collaborative evidence of dozens of new data points I did not know of prior. Furthermore, not a single data point was in contradiction to known facts, and future predictions started unfolding, as predicted. In the face of such overwhelming evidence and statistically completely impossible odds, we took the very difficult decision for us (We still had children ages 4, 6, 9, and 16 at home at the time) to sell my orthodontic practice along with my dream orthodontic building I had just finished building three months earlier and embark on stopping COVID-19 worldwide, on a non-profit basis, with the Cough Mask.

For over a year now, I have carefully analyzed this approach to COVID-19 from classical engineering, reverse engineering, and the medical sciences, and I can come to no conclusion other than is definitely a beautiful, master-piece, simple, and elegant solution to completely stop COVID-19, the cold, the flu, and future coronavirus outbreaks before they even become pandemics, with minimum interruption to our lives. Quite the opposite, the best news is that this approach to COVID-19 will quickly help usher in a completely different and wonderful world.

I would like to close with Reinhold Niebuhr's serenity prayer:

God, grant us the courage to change the things that must be changed, the serenity to accept the things that cannot be changed, And the wisdom to know the difference.

A particular illustrative embodiment of the invention is disclosed including but not limited to an apparatus for containing a cough and sneeze aerosol, the apparatus including but not limited a face mask characterized by a rigid first section configured to hold a filter and a pliable second section configured to fit on a person's face;
an air tight face mask seal formed on an outer edge of the pliable second section of the face mask having a curved surface on the face mask seal configured to fold inward to form a seal on the person's face when pressed on the person's face forming a positive pressure seal that contains positive pressure inside of the face mask, so that the cough and sneeze aerosol does not leak out edges of the face mask and the aerosol is forced though a low pressure drop aerosol filter inside of a removable filter holder removably attached inside of the rigid first section of the face mask, wherein the low pressure drop aerosol filter, wherein the low pressure filter is a low MERV filter, wherein the face mask is designed to have firm hand pressure applied to press the face mask against a person's face during the cough and sneeze to create a seal strong enough to contain a transient positive pressure inside of the face mask generated by the cough and sneeze for a duration of the cough and sneeze, wherein a stiffness property of the pliable section of the face mask is stiff enough to support firm hand held pressure applied to the face mask and soft enough to be pliable so as to mold around variation of the face and maintain the air tight seal, wherein the removable filter holder is removed and reinserted from a back side of the face mask inside of the face mask, wherein positive pressures inside of the face mask push the removable filter holder and a body of the face mask seal together tighter;

a first face mask holder arm ramp and a second face mask holder arm ramp formed on the rigid first section of the face mask, a first toggle surface formed on a first end of first face mask holder arm ramp and second toggle surface formed on a first end of second face mask holder arm ramp; a face mask holder configured to hold the face mask;

a first and second face mask holder arm rotationally attached to the face mask holder and configured to hold the face mask on the face mask holder; a first face mask holder arm having a first end hinged to the face mask holder and a second face mask holder arm having a first end hinged to the face mask holder; and a toggle mechanism on the face mask holder configured to rotate a first and second face mask holder arm inward to engage a first and second mask holder arm ramp on the face mask when the face mask is inserted into the face mask holder and rotate a second end of the first face mask holder arm and a second end of the second face mask holder arm outward and disengage a first and second face mask holder arm ramp toggle surface on the face mask when the face mask is removed from the face mask holder.

In another illustrative embodiment of the invention, substantially all a virus is stuck to the aerosol wherein capturing the aerosol in the aerosol filter indirectly captures the virus by capturing the aerosol in the aerosol filter wherein the aerosol filter is lower cost than a HEPA filter. In another illustrative embodiment of the invention, a viral load sufficient to cause an infection in a human being is only generally found in cough and sneeze aerosols larger than 5 microns in diameter, wherein a low MERV filter reduces pressure drop of the aerosol traveling through the filter and eliminated a need for non-washable filter pleated filter and non-washable electrostatic charging which allows use of a washable low MERV filter, wherein the washable low MERV filter lowers cost of filtration by enabling a purchase of low MERV filter material in low cost large rolls, conserves global material supplies and support an environment.

In another illustrative embodiment of the invention, the face mask is an emergency breathing mask.

In another illustrative embodiment of the invention, the apparatus further includes but is not limited to a face mask seal engagement member on the toggle mechanism configured to engage the face mask seal and cause the toggle mechanism to rotate a first and second face mask holder arm inward to engage the first and second face mask holder arm ramp and hold the face mask in the face mask holder, wherein the face mask holder is located out of a way to perform daily activities but close enough to be deployable at a moment's notice.

In another illustrative embodiment of the invention, the apparatus further includes but is not limited to one of a lanyard, a chest strap, an arm strap, a wrist strap, a leg strap, and a forehead strap. In another illustrative embodiment of the invention, the apparatus further includes but is not limited to a filter holder front section having air exit ports that are large enough to easily allow large airflow rates with minimum aerodynamic resistance.

In another illustrative embodiment of the invention, the face mask and filter holder are manufactured from low cost, readily available materials, using widely available, low cost manufacturing techniques including but not limited to injection molding wherein the materials are chosen for longevity. In another illustrative embodiment of the invention, an effectivity of the face mask is not affected by mutations in a virus.

In another illustrative embodiment of the invention, permanent straps are not attached to the face mask to avoid the straps accidentally falling under and break the air tight seal, wherein temporary straps are used including but not limited to Velcro. In another illustrative embodiment of the invention, a filter holder air intake screen matter expelled with a cough or sneeze including but not limited to mucous and food particles.

In another illustrative embodiment of the invention, the face mask does not extend over a bridge of a nose of a mask wearer to make it easier to for the face mask to be used while wearing glasses. In another illustrative embodiment of the invention, face mask holder is a hygienic cover plate that covers an open back part of the face mask while the face mask is docked in the face mask holder, wherein the hygienic cover plate adds stability and support to the face mask and helps hold the face mask in place.

In another illustrative embodiment of the invention, the face mask holder further comprises an angled extension that behave like a funnel to make docking of the face mask in the face mask holder easier. In another illustrative embodiment of the invention, the face mask is oriented upright to make an arch formed by the face mask seal edges match an arch of a person's hip to allow the face mask to be docked closes to the body and out of a way of normal daily activities and enables the face mask holder to be placed on either a right side and a left side of a boy for right handed and left handed individuals.

In another illustrative embodiment of the invention, the apparatus further includes but is not limited to a belt holder for carrying a small package of disinfectant wipes to wipe down the face, hands, and face mask after use. In another illustrative embodiment of the invention, the apparatus further includes but is not limited to a grip that allows the face mask to be grabbed and carried by one hand. In another illustrative embodiment of the invention, the face mask is large enough to easily cough and sneeze into and accommodate the filter and small enough for easy of handling and portability. In another illustrative embodiment of the invention, the filter is at least one of a multi-layered filter and a HEPA filter.

In another illustrative embodiment of the invention, the face is formed to match average facial contours and a geometry of the seal is designed to match the average facial contours. In another illustrative embodiment of the invention, the face mask is detachable from the face mask holder with a single quick outward tug on the face mask.

In another illustrative embodiment of the invention, the apparatus further includes but is not limited to a spring inside of the toggle mechanism attached between a first hinged end of the first face mask holder arm and a first hinged end of the second face mask holder arm, wherein the spring causes the second end of the first and second face mask holder arm to rotate outward and disengage from the first and second face mask holder arm ramp on the face mask when the face mask is removed from the face mask holder.

In another illustrative embodiment of the invention, the apparatus further includes but is not limited to a first face mask holder arm tab formed on a first hinged end of the first face mask holder arm and a second face mask holder arm tab formed on a first hinged end of the second face mask holder arm to limit outward rotation of the second end of the first and second face mask holder arm. In another illustrative embodiment of the invention, the apparatus further includes but is not limited to a toggle surface formed on the first hinged end of the first and second face mask holder arm configured to cause the second end of first and second mask holder arms to rotate inward when the face mask seal in inserted into a face mask seal engagement member.

In another illustrative embodiment of the invention, the apparatus further includes but is not limited to a slot formed in the first end of the first and second mask holder arms configured to attach the spring between the first and second mask holder arms. In another illustrative embodiment of the invention, the apparatus further includes but is not limited to a belt clip attached to the face mask holder configured to attach the face mask holder to a person's belt for carrying the face mask on a person's belt. In another illustrative embodiment of the invention, face mask holder is configured with sides that overlap the face mask seal when the face mask is fully inserted into the face mask holder.

In another illustrative embodiment of the invention, the apparatus further includes but is not limited to a filter holder receptacle opening formed in the rigid first section of the face mask holder configured to form an airtight seal between the filter holder receptacle opening and a filter holder front section when the filter holder front section is inserted into the filter holder receptacle opening. In another illustrative embodiment of the invention, the spring is a flat spring.

In another illustrative embodiment of the invention a method is disclosed for containing a cough aerosol, the method including but not limited to sliding a pair of face mask holder arm pads over a toggle surface on a face mask holder arm ramp; triggering a toggle mechanism by the sliding of the arm pads over the toggle surface; rotating a pair of mask holder arms on a face mask holder, outward and away from the pair of face mask holder ramps on a face mask using a toggle mechanism to release the face from the face mask holder; sealing the face mask to a person's face with an inward fold on a face mask seal when the person holds the face mask to their face; receiving a cough aerosol in the face mask from a person's face while the face mask is held to the person's face; and filtering the cough aerosol in the face mask through a high flow rate filter in the face mask.

In another illustrative embodiment of the method, the method further includes but is not limited to engaging the face mask with the toggle mechanism when the face mask is inserted into the face mask holder; and rotating via the toggle mechanism the pair of mask holder arms, inward and toward a pair of face mask holder ramps on the face mask using the toggle mechanism to secure the face in the face mask holder.

The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims.

The invention claimed is:

1. An apparatus for containing a cough and sneeze aerosol, the apparatus comprising:
  a face mask characterized by a rigid first section configured to hold a filter and a pliable second section configured to fit on a person's face;
  an air tight face mask seal formed on an outer edge of the pliable second section of the face mask having a
  curved surface on the face mask seal configured to fold inward to seal on the person's face when pressed on the person's face, forming a positive pressure seal that contains the positive pressure inside of the face mask, so that the cough and sneeze aerosol does not leak out the outer edge of the face mask and the aerosol is forced though a low pressure drop aerosol filter inside of a removable filter holder removably attached inside of the rigid first section of the face mask, wherein the lower pressure drop aerosol filter is a MERV filter of 5-8, wherein the face mask is designed to have a firm hand held pressure applied to press the face mask against the person's face during the cough and sneeze to seal strong enough to contain the positive pressure inside of the face mask generated by the cough and sneeze for a duration of the cough and sneeze, wherein a stiffness property of the pliable second section of the face mask is stiff enough to support the firm hand held pressure applied to the face mask and soft enough to be pliable so as to mold around variations of the face and maintain the air tight face mask seal, wherein the removable filter holder is removable and reinsertable from a back side of the face mask inside of the face mask, wherein positive pressure inside of the face mask push the removable filter holder and a body of the face mask seal tighter together;
  a first face mask holder arm ramp and a second face mask holder arm ramp formed on the rigid first section of the face mask,
  a first toggle surface formed on a first end of first face mask holder arm ramp and second toggle surface formed on a first end of a second face mask holder arm ramp;
  a face mask holder configured to hold the face mask;
  the first and second face mask holder arm rotationally attached to the face mask holder and configured to hold the face mask on the face mask holder;
  a first face mask holder arm having a first end hinged to the face mask holder and a second face mask holder arm having a first end hinged to the face mask holder; and
  a toggle mechanism on the face mask holder configured to rotate the first and second face mask holder arms inward
  to engage the first and second mask holder arm ramps on the face mask when the face mask is inserted into the face mask holder and rotate a second end of the first face mask holder arm and a second end of the second face mask holder arm outward and disengage the first and second face mask holder arm ramp toggle surfaces on the face mask when the face mask is removed from the face mask holder.

2. The apparatus of claim 1, wherein substantially all of a virus is stuck to the aerosol wherein capturing the aerosol in the aerosol filter indirectly captures the virus by capturing the aerosol in the aerosol filter.

3. The apparatus of claim 1, wherein a viral load sufficient to cause an infection in a human being is only generally found in cough and sneeze aerosol larger than 5 microns in diameter, wherein the MERV filter reduces pressure drop of the aerosol traveling through the filter and eliminates a need for non-washable filter, pleated filter, and non-washable electrostatic charging; wherein the MERV filter is a washable MERV filter, wherein the washable MERV filter enabling a purchase of MERV filter material in low cost large rolls, conserves global material supplies and support an environment.

4. The apparatus of claim 1, wherein the face mask is an emergency breathing mask.

5. The apparatus of claim 1, the apparatus further comprising: a face mask seal engagement member on the toggle mechanism configured to engage the face mask seal and cause the toggle mechanism to rotate the first and second face mask holder arm inward to engage the first and second face mask holder arm ramp and hold the face mask in the face mask holder, wherein the face mask holder is located to perform daily activities but close enough to be deployable at a moment's notice.

6. The apparatus of claim 5, wherein the face mask holder further comprises one of a lanyard, a chest strap, an arm strap, a wrist strap, a leg strap, and a forehead strap.

7. The apparatus of claim 1, wherein a filter holder front section has air exit ports that are large enough to easily allow large airflow rates with minimum aerodynamic resistance.

8. The apparatus of claim 1, wherein the face mask and filter holder are manufactured from readily available materials, using widely available manufacturing techniques comprising injection molding wherein the materials are chosen for longevity.

9. The apparatus of claim 1, wherein an effectivity of the face mask is not affected by mutations in a virus.

10. The apparatus of claim 1, wherein permanent straps are not attached to the face mask to avoid the straps accidentally falling under and break the air tight seal, wherein temporary straps are used comprising hook and loop fasteners.

11. The apparatus of claim 1, wherein a filter holder air intake screen matter expelled with a cough or
sneeze comprising mucous and food particles.

12. The apparatus of claim 1, wherein the face mask is configured to not extend over a bridge of a nose of a mask wearer to make it easier to for the face mask to be used while wearing glasses.

13. The apparatus of claim 1, wherein the face mask holder is a hygienic cover plate that covers an open back part of the face mask while the face mask is docked in the face mask holder, wherein the hygienic cover plate adds stability and support to the face mask and helps hold the face mask in place.

14. The apparatus of claim 1, wherein the face mask holder further comprises an angled extension that behaves like a funnel to make docking of the face mask in the face mask holder easier.

15. The apparatus of claim 1, wherein the face mask is oriented upright to make an arch formed by the face mask seal edge are configured to match an arch of a person's hip to allow the face mask to be docked closes to the body and out of a way of normal daily activities and enables the face mask holder to be placed on either a right side and a left side of a body for right handed and left handed individuals.

16. The apparatus of claim 1, further comprising a belt holder for carrying a small package of disinfectant wipes to wipe down the face, hands, and face mask after use.

17. The apparatus of claim 1, wherein the face mask further comprises a grip that allows the face mask to be grabbed and carried by one hand.

18. The apparatus of claim 1 wherein the face mask is large enough to easily cough and sneeze into and accommodate the filter and small enough for easy of handling and portability.

19. The apparatus of claim 1, wherein the filter is a multi-layered filter.

20. The apparatus of claim 1, wherein the face mask is formed to match facial contours and a geometry
of the seal is designed to match the facial contours.

21. The apparatus of claim 1 wherein the face mask is detachable from the face mask holder with a single quick outward tug on the face mask.

22. The apparatus of claim 1, the apparatus further comprising:
a spring inside of the toggle mechanism attached between the first hinged end of the first face mask holder arm and a first hinged end of the second face mask holder arm, wherein the spring causes the second end of the first and second face mask holder arm to rotate outward and disengage from the first and second face mask holder arm ramp on the face mask when the face mask is removed from the face mask holder.

23. The apparatus of claim 22, the apparatus further comprising:
a first face mask holder arm tab formed on the first hinged end of the first face mask holder arm and a second face mask holder arm tab formed on the first hinged end of the second face mask holder arm to limit outward rotation of the second end of the first and second face mask holder arm.

24. The apparatus of claim 23, the apparatus further comprising:
the toggle surfaces formed on the first hinged end of the first and second face mask holder arms configured to cause the second end of first and second mask holder arms to rotate inward when the face mask seal in inserted into a face mask seal engagement member.

25. The apparatus of claim 24, the apparatus further comprising:
a slot formed in the first end of the first and second mask holder arms configured to attach the spring between the first and second mask holder arms.

26. The apparatus of claim 24, the apparatus further comprising:
a belt clip attached to the face mask holder configured to attach the face mask holder to the person's belt for carrying the face mask on a person's belt.

27. The apparatus of claim 25, wherein face mask holder is configured with sides that overlap the face mask seal when the face mask is fully inserted into the face mask holder.

28. The apparatus of claim 27, the apparatus further comprising:
a filter holder receptacle opening formed in the rigid first section of the face mask holder configured to form an airtight seal between the filter holder receptacle opening and a filter holder front section when the filter holder front section is inserted into the filter holder receptacle opening.

29. The apparatus of claim 28, wherein the spring is a flat spring.

\* \* \* \* \*